United States Patent
Chen et al.

(10) Patent No.: US 12,151,459 B2
(45) Date of Patent: Nov. 26, 2024

(54) WEDGE-SHAPED MULTI-LAYER INTERLAYER WITH OUTER SKIN LAYERS OF VARYING THICKNESS

(71) Applicant: Solutia Inc., St. Louis, MO (US)

(72) Inventors: Wenjie Chen, Amherst, MA (US); John Joseph D'Errico, Glastonbury, CT (US); Lora Lee Spangler, Belchertown, MA (US); Gary Matis, Wilbraham, MA (US); Yalda Farhoudi, Longmeadow, MA (US); Bruce Edward Wade, Gray, TN (US)

(73) Assignee: Solutia Inc., St. Louis, MO (US)

( * ) Notice: Subject to any disclaimer, the term of this patent is extended or adjusted under 35 U.S.C. 154(b) by 143 days.

(21) Appl. No.: 17/757,151

(22) PCT Filed: Dec. 17, 2020

(86) PCT No.: PCT/US2020/065651
§ 371 (c)(1),
(2) Date: Jun. 10, 2022

(87) PCT Pub. No.: WO2021/127206
PCT Pub. Date: Jun. 24, 2021

(65) Prior Publication Data
US 2022/0371300 A1    Nov. 24, 2022

Related U.S. Application Data

(60) Provisional application No. 63/199,276, filed on Dec. 17, 2020, provisional application No. 62/704,267, (Continued)

(51) Int. Cl.
*B32B 27/30*    (2006.01)
*B29C 48/07*    (2019.01)
(Continued)

(52) U.S. Cl.
CPC ............. *B32B 3/263* (2013.01); *B29C 48/07* (2019.02); *B29C 48/21* (2019.02);
(Continued)

(58) Field of Classification Search
CPC ......... A61P 13/12; B29C 48/07; B29C 48/21; B29C 48/2552; B29C 48/268;
(Continued)

(56) References Cited

U.S. PATENT DOCUMENTS 2,282,026 A    5/1942    Bren et al.
2,282,057 A    5/1942    Hopkins et al.
(Continued)

FOREIGN PATENT DOCUMENTS

CN    110315822 A    10/2019
EP    2 612 843 A1    7/2013
(Continued)

OTHER PUBLICATIONS

Extended European Search Report completed Jan. 30, 2024 received in Regional Phase EP Application No. 20903169.9.
(Continued)

*Primary Examiner* — Lawrence D Ferguson
(74) *Attorney, Agent, or Firm* — Steven A. Owen

(57) ABSTRACT

Multiple layer interlayers having enhanced optical and acoustic properties are provided, along with methods of making and using the same. Interlayers as described herein may include at least two outer skin layers and an inner core layer, with one of the outer skin layers having a different thickness than the other at one or more locations along the interlayer. The multi-layer interlayer may also exhibit acoustic properties and, in some cases, may have an overall wedged thickness profile. Additionally, in some aspects, interlayers and laminates formed therefrom may also pro-
(Continued)

vide reduced infrared energy transmission, without sacrificing acoustic and/or optical performance.

8 Claims, 10 Drawing Sheets

Related U.S. Application Data filed on May 1, 2020, provisional application No. 62/950,314, filed on Dec. 19, 2019.

(51) Int. Cl.
| | |
|---|---|
| *B29C 48/21* | (2019.01) |
| *B29C 48/25* | (2019.01) |
| *B29C 48/255* | (2019.01) |
| *B32B 3/26* | (2006.01) |
| *B32B 7/027* | (2019.01) |
| *B32B 27/08* | (2006.01) |
| *B32B 27/20* | (2006.01) |
| *B32B 27/22* | (2006.01) |
| *B29K 29/00* | (2006.01) |
| *B29L 31/30* | (2006.01) |

(52) U.S. Cl.
CPC ........ *B29C 48/2552* (2019.02); *B29C 48/268* (2019.02); *B32B 7/027* (2019.01); *B32B 27/08* (2013.01); *B32B 27/20* (2013.01); *B32B 27/22* (2013.01); *B32B 27/30* (2013.01); *B29K 2029/14* (2013.01); *B29L 2031/30* (2013.01); *B32B 2250/03* (2013.01); *B32B 2250/246* (2013.01); *B32B 2264/301* (2020.08); *B32B 2307/30* (2013.01); *B32B 2307/40* (2013.01); *B32B 2307/732* (2013.01); *B32B 2605/006* (2013.01)

(58) Field of Classification Search
CPC ............ B29K 2029/14; B29L 2031/30; B32B 17/10165; B32B 17/10568; B32B 17/10577; B32B 17/10761; B32B 2250/03; B32B 2250/246; B32B 2255/10; B32B 2255/20; B32B 2255/205; B32B 2264/02; B32B 2264/102; B32B 2264/105; B32B 2264/12; B32B 2264/301; B32B 2270/00; B32B 2307/10; B32B 2307/102; B32B 2307/30; B32B 2307/40; B32B 2307/402; B32B 2307/412; B32B 2307/538; B32B 2307/558; B32B 2307/56; B32B 2307/732; B32B 2419/00; B32B 2605/006; B32B 27/06; B32B 27/08; B32B 27/20; B32B 27/22; B32B 27/30; B32B 27/304; B32B 27/306; B32B 27/308; B32B 27/32; B32B 27/36; B32B 27/365; B32B 27/38; B32B 27/40; B32B 3/02; B32B 3/263; B32B 7/027; B32B 17/10018; B32B 17/10036; B32B 17/10633; B32B 17/10935; B32B 2307/7376; B32B 2309/105; C12Q 1/6806; C12Q 1/686; C12Q 1/6876; C12Q 1/6883; C12Q 2600/112; C12Q 2600/118; C12Q 2600/158; C12Q 2600/166

See application file for complete search history.

(56) References Cited

U.S. PATENT DOCUMENTS

| | | | |
|---|---|---|---|
| 6,737,159 | B2 | 5/2004 | Garrett et al. |
| 7,883,761 | B2 | 2/2011 | Bourcier et al. |
| 9,311,699 | B2 | 4/2016 | Hurlbut |
| 10,596,785 | B2 | 3/2020 | Oota et al. |
| 10,913,244 | B2 | 2/2021 | Oota et al. |
| 2005/0142332 | A1* | 6/2005 | Sauer .................. B32B 17/1066 428/172 |
| 2007/0231550 | A1 | 10/2007 | Stenzel |
| 2009/0294212 | A1 | 12/2009 | Miyai |
| 2011/0076459 | A1 | 3/2011 | Lu et al. |
| 2012/0133764 | A1 | 5/2012 | Hurlbut |
| 2013/0149503 | A1 | 6/2013 | Yamamoto et al. |
| 2016/0311199 | A1 | 10/2016 | Iwamoto et al. |
| 2017/0072665 | A1 | 3/2017 | Iwamoto et al. |
| 2017/0100918 | A1 | 4/2017 | Lu |
| 2017/0136742 | A1 | 5/2017 | Oota et al. |
| 2017/0225435 | A1 | 8/2017 | Hirano et al. |
| 2017/0285339 | A1 | 10/2017 | Spangler et al. |
| 2018/0117883 | A1 | 5/2018 | Olson et al. |
| 2018/0264785 | A1 | 9/2018 | Oota et al. |
| 2018/0272661 | A1 | 9/2018 | Nishino et al. |
| 2018/0297332 | A1 | 10/2018 | Nishino et al. |
| 2019/0061322 | A1 | 2/2019 | Oota et al. |
| 2020/0391484 | A1 | 12/2020 | Oota et al. |
| 2021/0046737 | A1 | 2/2021 | Nohara et al. |
| 2021/0046738 | A1 | 2/2021 | Izu et al. |
| 2021/0078303 | A1 | 3/2021 | Nohara et al. |

FOREIGN PATENT DOCUMENTS

| | | |
|---|---|---|
| JP | 06198809 A | 7/1994 |
| KR | 102005670 B1 | 7/2019 |
| WO | WO 2014/168793 A1 | 10/2014 |
| WO | WO 2015/066114 A1 | 5/2015 |
| WO | WO 2017/011435 A1 | 1/2017 |
| WO | WO 2017/105821 A1 | 6/2017 |
| WO | WO 2017105812 A1 | 6/2017 |
| WO | WO 2021200961 A1 | 10/2021 |

OTHER PUBLICATIONS

ASTM D542, "Standard Test Method for Index of Refraction of Transparent Organic Plastics"; Mar. 2014.
ASTM D1003, "Standard Test Method for Haze and Luminous Transmittance of Transparent Plastics"; Jun. 2021.
ASTM D1396, "Standard Test Methods for Chemical Analysis of Poly(Vinyl Butyral)"; Reapproved 1998.
Notification of Transmittal of the International Search Report and the Written Opinion of the International Searching Authority, or the Declaration date of mailing Apr. 15, 2021 received in International Application No. PCT/US2020/065651.
Wade, B.; "Vinyl Acetal Polymers"; Encyclopedia of Polymer Science and Technology; 2016 22 pgs. (online).

* cited by examiner

WEDGE-SHAPED MULTI-LAYER INTERLAYER WITH OUTER SKIN LAYERS OF VARYING THICKNESS

CROSS-REFERENCE TO RELATED APPLICATION(S)

This application is a national stage filing under 35 USC § 371 of International Application Number PCT/US2020/065651, filed on Dec. 17, 2020 which claims the benefit of the filing date to U.S. Provisional Application No. 62/950,314 filed on Dec. 19, 2019, and U.S. Provisional Application No. 62/704,267 filed on May 1, 2020 and U.S. Provisional Application No. 63/199,276 filed on Dec. 17, 2020, the entire disclosures of which are incorporated by reference herein.

FIELD OF THE INVENTION

This invention relates to polymeric interlayers, as well as methods of making and using the same. Such interlayers may be used to form multiple layer panels, such as windshields or windows, having desirable properties.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet, or interlayer, disposed between two sheets of glass. Safety glass often is used in automotive and architectural applications. Its main function is to absorb energy, such as that caused by a blow from an object, without allowing penetration through the opening or the dispersion of shards of glass, thus minimizing damage or injury to the objects or persons near the glass. Safety glass also can be used to provide other beneficial effects, such as to reduce ultraviolet (UV) and/or infrared (IR) light transmission, and/or enhance the appearance and aesthetic appeal of window openings.

Safety glass interlayers have also been used as an important component in automobile head-up display (HUD) systems, which can provide an image, such as for example an instrument cluster image, at the eye level of a driver of the automobile. Such a display allows a driver to stay focused on the upcoming road while visually accessing dashboard information. One type of interlayer used in such head-up display systems is wedge shaped in vertical cross section. The wedge shape of the interlayer is used to provide the correct light dynamics through the windshield required for a head-up display. Unfortunately, as with standard windshields, head-up display windshields can also lead to an undesirably high noise transmission level through the windshield.

To address the noise transmission, multi-layer interlayers have been used which include at least one acoustic, or sound-dampening, polymeric layer. The acoustic layer may have different physical and/or chemical properties than the surrounding layers, which can contribute to less-than-desirable optical properties, such as cloudiness or mottle.

Additionally, some interlayers include an infrared absorbing compound to control the amount of energy passing through the window or windshield and into the cabin of the vehicle. One example of an infrared absorbing compound is infrared absorbing particles, which can be dispersed throughout the interlayer. High concentrations of infrared absorbing particles can interfere with transmission of specific wavelength ranges of infrared energy, such as from external traffic sensors or even from on-board sensors, such as rain sensors working in the wavelength range of about 850 nm to about 1050 nm. On the other hand, low concentrations of infrared absorbing particles may not block sufficient amounts of radiation, which results in undesired heating in the vehicle cabin due to the transmission of infrared light.

Thus, a need exists for further improved compositions and methods for maintaining both the sound dampening characteristics and visual properties of multiple layer glass panels, and in particular, for multiple layer glass panels in which a wedge-shaped interlayer is used to provide for head-up display capability. It would be advantageous for the interlayer to provide sufficient infrared absorbing characteristics, while maintaining desirable strength and sound dampening properties.

SUMMARY

In one aspect, the present invention concerns a wedge-shaped multi-layer interlayer comprising: a first polymeric layer having a wedge shape; a second polymeric layer having a wedge shape; and a third polymeric layer between the first and second layers, wherein the first and second layers each have a Tg that is at least 10° C. higher than the glass transition temperature (Tg) of the third layer, and wherein, at one or more locations on the interlayer, the second layer is at least 10 percent thicker than the first layer, and wherein at least one of the first and second layers has a thickness of not more than 0.30 mm at one or more locations on the interlayer.

In another aspect, the present invention concerns a multi-layer interlayer comprising first, second, and third polymeric layers, wherein the third layer is positioned between the first and second layers, wherein the first and second layers each have a Tg that is at least 10° C. higher than the Tg of the third layer, wherein, at one or more locations on the interlayer, the first layer has a thickness of less than 0.3 millimeters and the second layer has a thickness of greater than 0.3 millimeters, and wherein at least one of the following criteria (i) through (iii) are met—(i) at one or more locations on the interlayer, the first layer has a thickness of at least 0.2 mm; (ii) at one or more locations on the interlayer, the ratio of the thickness of the second layer to the thickness of the first layer is not more than 2.5:1; and (iii) the maximum of the difference between the polyvinyl acetate contents of any two of the first, second, and third polymeric layers is not more than 13 weight percent.

In another aspect, the present invention concerns a wedge-shaped multi-layer interlayer comprising a first wedge-shaped polymeric outer layer, a second wedge-shaped polymeric outer layer, and a polymeric core layer sandwiched between the first and second outer layers, wherein the outer layers each have a Tg that is at least 10° C. greater that the Tg of the core layer, wherein the interlayer has an overall wedge angle of at least 0.05 milliradians and not more than 1 milliradians, wherein the interlayer has a thinnest edge and a thickest edge, wherein a maximum thickness of at least one of the first and second outer layers does not exceed 0.3 mm within 40 centimeters of the thinnest edge.

In another aspect, the present invention concerns a wedge-shaped multi-layer interlayer comprising first, second, and third polymeric layers, wherein the third layer is positioned between the first and second layers, wherein the first and second layers each have a Tg that is at least 10° C. higher than the Tg of the third layer, wherein the first layer has a thickness profile defined by the following formula:

$$[0.0024(D_e)+0.06] < T_1 < [1.975141-(1.6936517)/(1+(D_e/155.2664)^{\wedge}3.324064)]$$

wherein $D_e$ is the distance in centimeters from the thinnest edge of the interlayer and wherein $T_1$ is the thickness in millimeters of the first layer at $D_e$.

In another aspect, the present invention concerns a multi-layer glazing comprising a first rigid substrate, a second rigid substrate, and an interlayer sandwiched between the first and second substrates, wherein the interlayer is the interlayer described in any of the preceding paragraphs.

In another aspect, the present invention concerns a method of producing a multi-layer interlayer, the method comprising (a) providing a skin resin; (b) providing core resin having a different composition than the skin resin; (c) forming a first skin layer from a portion of the skin resin and a second skin layer from another portion of the skin resin, wherein the forming includes supplying the resin used to form the first skin layer to a die at a different mass flow rate than the mass flow rate of the skin resin used to form the second skin polymeric layer; (d) forming a core layer from at least a portion of the core resin; and (e) forming a multilayer polymeric layer from the first skin layer, the second skin layer, and said core layer, wherein, at one or more portions of the multilayer polymeric layer, the first skin layer is at least 10 percent thicker than the second skin layer.

In another aspect, there is provided a wedge-shaped multilayer interlayer comprising a first polymeric layer having a wedge shape, a second polymeric layer, and a third polymeric layer between the first and second layers, wherein the first and second layers each have a glass transition temperature (Tg) that is at least 10° C. higher than the Tg of the third layer, wherein the interlayer comprises a tapered zone having a thinnest edge and a thickest edge, wherein the thickness of the first polymeric layer at the thinnest edge of the tapered zone is greater than the thickness of the first polymeric layer at the thickest edge of the tapered zone.

In still another aspect, one example of which is generally illustrated in FIG. 13, there is provided a wedge-shaped multilayer interlayer comprising first, second, and third polymeric layers, wherein the third layer is positioned between the first and second layers and wherein at least one of the first and second layers are wedge-shaped. The interlayer has a tapered zone having a thinnest edge and a thickest edge, wherein, at all points along a vertical centerline extending between the thinnest and thickest edges, the following relationship is satisfied:

$$1.25 Tca > TcL > 0.75 Tca$$

where TcL is the local combined thickness of the first and second layers and Tca is the average combined thickness of the first and second layers calculated as follows:

$$Tca=(Tc1+Tc2)/2$$

wherein Tc1 is the combined thickness of the first and second layers at the thinnest edge and Tc2 is the combined thickness of the first and second layers at the thickest edge. In some embodiments, illustrated in, for example, FIG. 13, the thickness of the first layer at the thinnest edge (shown as T1s1) and the thickness of the second layer at the thinnest edge (shown as T2s1) are summed to provide Tc1, while the thickness of the first layer at the thickest edge (shown as T1s2) and the thickness of the second layer at the thickest edge (T2s2) can be summed to provide Tc2.

In a still further aspect, there is provided a wedge-shaped multi-layer interlayer comprising first, second, and third polymeric layers, wherein the third layer is positioned between the first and second layers, wherein at least one of the first and second layers is wedge-shaped. The Interlayer comprises a tapered zone having a thinnest edge and a thickest edge, wherein the first layer has a thickness that increases from the thinnest edge to the thickest edge of the tapered zone, wherein the second layer has a thickness that decreases from the thinnest edge to the thickest edge of the tapered zone, and wherein at least one of the first, second, and third layers comprises at least one IR absorbing agent.

In an even further aspect, there is provided a wedge-shaped multi-layer interlayer comprising first, second, and third polymeric layers, wherein the third layer is positioned between the first and second layers and at least one of the first and second layers is wedge-shaped. The interlayer has a tapered zone having a thinnest edge and a thickest edge and an overall wedge angle of at least 0.30 mrad, wherein the total solar transmittance (% Tts) measured at the thickest edge of the tapered zone is within about 5% of the total solar transmittance measured at the thinnest edge of the tapered zone. At least one of the first, second, and third polymeric layers includes an IR absorber, wherein each of the layers that includes an IR absorber is formed from the same polymeric material at both the thinnest and thickest edge of the tapered zone.

BRIEF DESCRIPTION OF THE DRAWINGS

Various embodiments of the present technology are described in detail below with reference to the attached drawing Figures, wherein:

FIG. 12g is a vertical cross-section of a wedge-shaped interlayer according to embodiments of the present technology, particularly illustrating yet another example of an interlayer with a skin layer having a reverse wedge configuration.

DETAILED DESCRIPTION

Polymeric interlayers suitable for forming laminates, such as windshields and other glass laminates, are described herein, along with methods of making and using such interlayers. The interlayers described herein may comprise acoustic interlayers having sound-dampening properties. Additionally, in some cases, the interlayers may be wedge-shaped or tapered, while in other cases, the interlayers may be flat. Further, the interlayers described herein may also exhibit enhanced optical properties, such as mottle, making them particularly suitable for automotive applications.

As used herein, the terms "polymer resin composition" and "resin composition" refer to compositions including one or more polymer resins. Polymer compositions may optionally include other components, such as plasticizers and/or other additives. As used herein, the terms "polymer polymeric layer" and "polymeric layer" refer to one or more polymer resins, optionally combined with one or more plasticizers, that have been formed into a polymeric sheet. Again, polymeric layers can include additional additives, although these are not required. As used herein, the term "interlayer" refers to a single or multiple layer polymer sheet suitable for use with at least one rigid substrate to form a multiple layer panel. The terms "single-sheet'" interlayer and "monolithic" interlayer refer to interlayers formed of one single resin sheet, while the terms "multiple layer" and "multi-layer" interlayer refer to interlayers having two or more resin sheets coextruded, laminated, or otherwise coupled to one another.

Figure 1A:
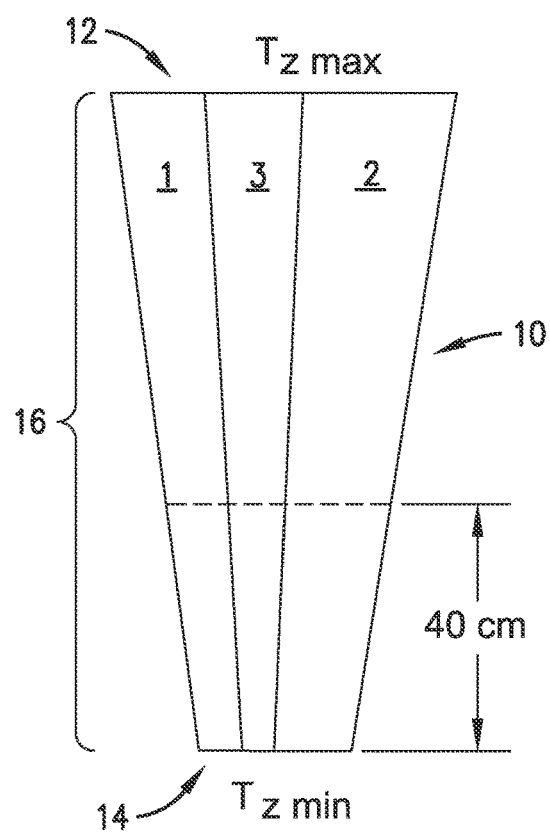
FIG. 1a is a vertical cross-section of a wedge-shaped interlayer according to embodiments of the present technology, particularly illustrating particular dimensions of the interlayer.
Figure 1B:
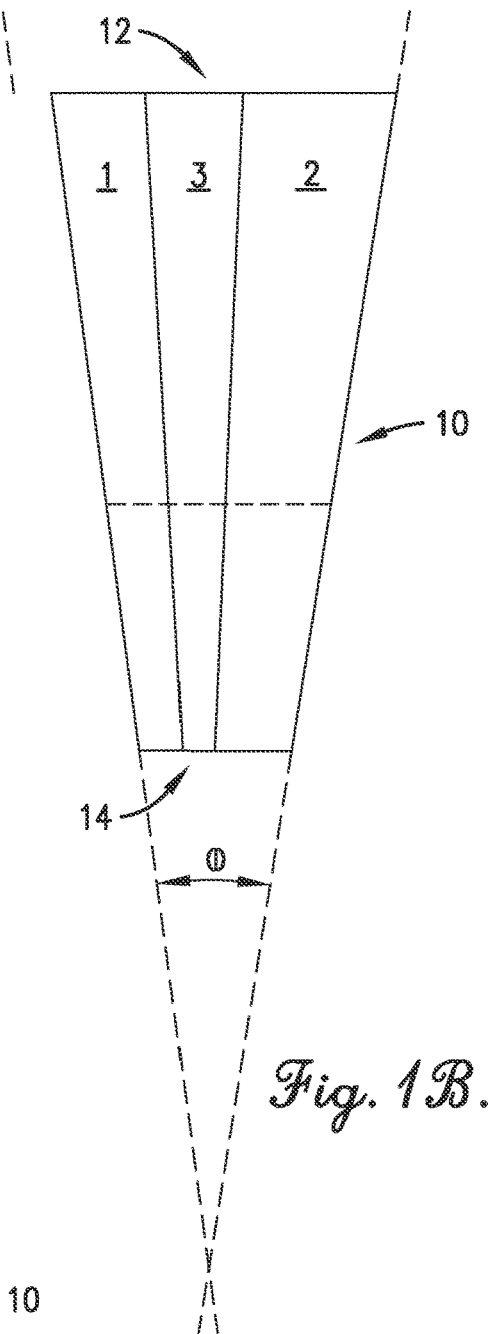
FIG. 1b is a vertical cross-section of a wedge-shaped interlayer according to embodiments of the present technology, particularly illustrating measurement of a wedge angle.
Figure 1C:
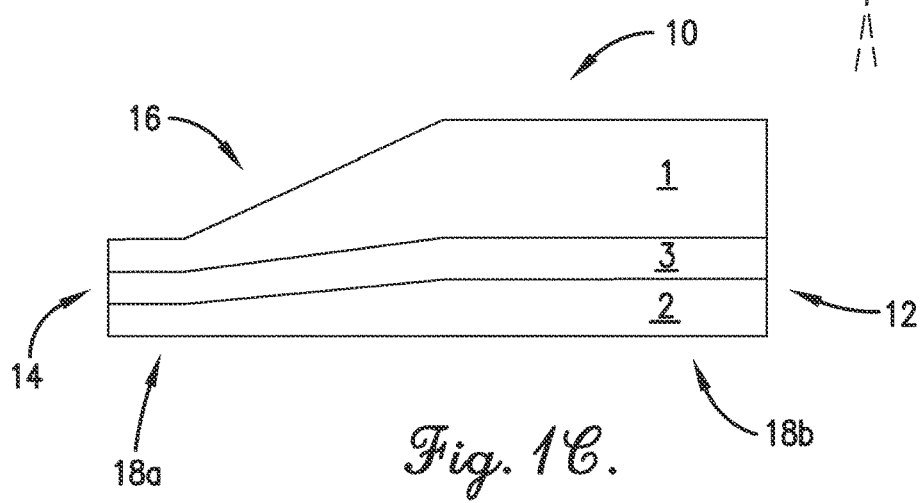
FIG. 1c is a vertical cross-section of a wedge-shaped interlayer according to embodiments of the present technology, particularly showing an interlayer with a tapered zone disposed between multiple flat zones.
Figure 2:
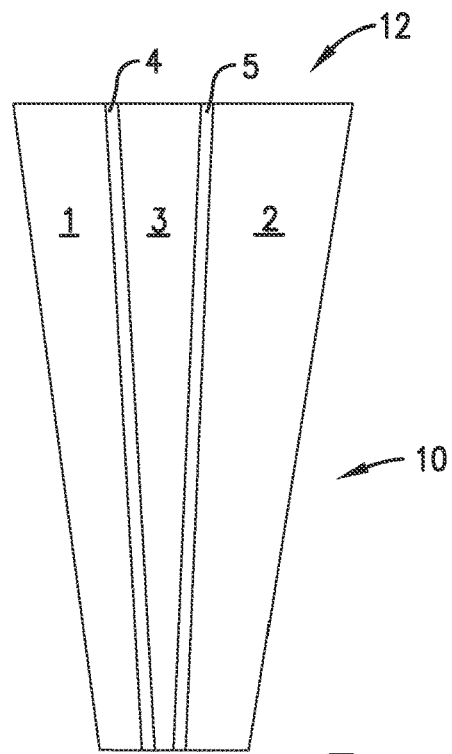
FIG. 2 is a vertical cross-section of a wedge-shaped interlayer according to embodiments of the present technology, particularly illustrating an interlayer with more than three polymeric layers.
Figure 3:
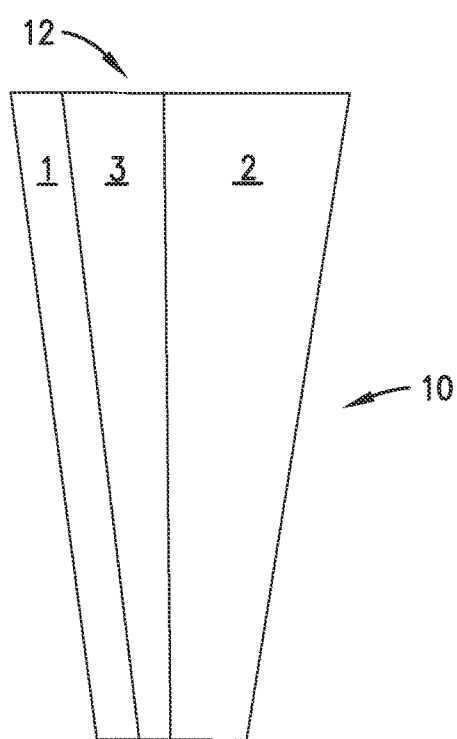
FIG. 3 is a vertical cross-section of a wedge-shaped interlayer according to embodiments of the present technology, particularly illustrating one example of an interlayer with skin layers of different thicknesses.
Figure 4:
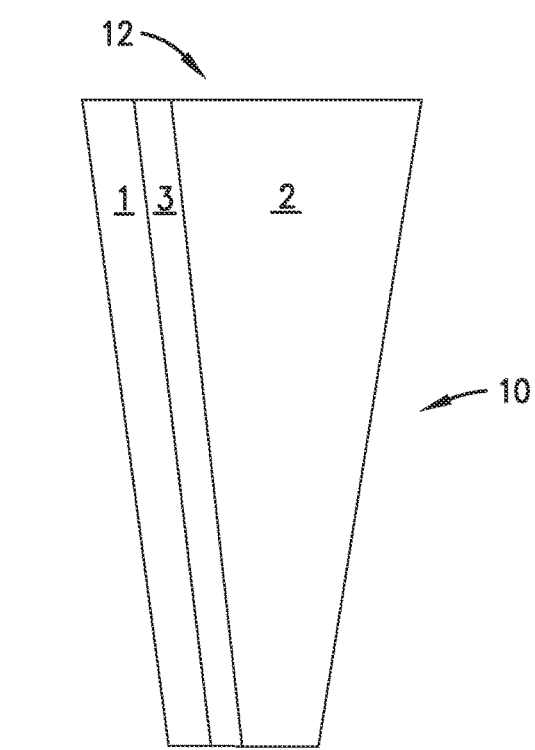
FIG. 4 is a vertical cross-section of a wedge-shaped interlayer according to embodiments of the present technology, particularly illustrating another example of an interlayer with skin layers of different thicknesses.

Turning now to FIGS. 1-5, several embodiments of interlayers 10 are shown. As illustrated in FIGS. 1-5, interlayers 10 as described herein may comprise a multi-layer interlayer having, for example, a first polymeric layer 1, a second polymeric layer 2, and a third polymeric layer 3. As used herein, the terms "first," "second," "third," and the like are used to describe various elements, but such elements should not be unnecessarily limited by these terms. These terms are only used to distinguish one element from another and do not necessarily imply a specific order or even a specific element. For example, an element may be regarded as a "first" element in the description and a "second" element in the claims without being inconsistent. Consistency is maintained within the description and for each independent claim, but such nomenclature is not necessarily intended to be consistent therebetween. One embodiment of an interlayer including a fourth layer 4 and a fifth layer 5 disposed between the first layer 1 and the third layer 3 and the third layer 3 and the second layer 2, respectively, is depicted in FIG. 2.

In some embodiments, the interlayer 10 may have an overall wedged or wedge-shaped profile. As used herein, the term "wedge-shaped" or "wedged" means having a cross-sectional geometry at least a portion of which increases from a relatively thin dimension to a relatively thicker dimension. As shown in FIG. 1, when wedged, the interlayer may comprise a tapered zone 16 having a thinnest edge 14 and an oppositely-disposed thickest edge 12 and may exhibit a non-uniform thickness profile between the thinnest and thickest edges 14, 12. In some embodiments, a wedge-shaped interlayer or layer may have a minimum wedge angle of at least 0.05 mrad.

In some embodiments, the thickest edge 12 of the tapered zone 16 may have a total thickness (of all layers at that point) of at least about 0.60, at least about 0.65, at least about 0.70, at least about 0.75, at least about 0.80, at least about 0.85, or at least about 0.90 mm and/or not more than about 2.0, not more than about 1.95, not more than about 1.90, not more than about 1.85, not more than about 1.80, not more than about 1.75, not more than about 1.70, not more than about 1.65, not more than about 1.60, not more than about 1.55, or not more than about 1.50 mm.

The thinnest edge 14 of the tapered zone 16 may have a total thickness (of all layers at that point) of at least about 0.50, at least about 0.55, at least about 0.60, at least about 0.65, or at least about 0.70 mm and/or not more than about 1.1, not more than about 1.0, not more than about 0.95, not more than about 0.90, not more than about 0.85, not more than about 0.80, not more than about 0.75, or not more than about 0.70 mm.

In some embodiments, at least about 10, at least about 20, at least about 30, at least about 40, at least about 50, at least about 60, at least about 70, at least about 80, or at least about 90 percent of the total vertical cross-section of the interlayer 10 may be wedged or may have a non-uniform thickness. As used herein, the term "vertical cross-section," refers to the cross-section taken between the thickest and thinnest edges 12, 14 of a wedged interlayer 10 (or tapered zone 16). FIGS. 1-4 depict various embodiments of wedged interlayers 10 taken along the vertical cross-section of each. Additionally, or in the alternative, not more than about 90, not more than about 80, not more than about 70, not more than about 60, not more than about 50, not more than about 40, not more than about 30, or not more than about 20 percent of the total vertical cross-section of the interlayer 10 may be of non-uniform thickness. In other cases, the entire (100 percent) of the vertical cross-section may be wedged. As an example, all of the vertical cross-sections of the interlayers depicted in FIGS. 1-4 have a total vertical cross-section of non-uniform thickness.

In some embodiments, at least one of the edges of the tapered zone 16 may be located at or near at least one of the edges of the interlayer itself (shown as thickest edge 12 and thinnest edge 14 in FIG. 1), while, in other embodiments, the edges of the tapered zone 16 may be spaced away from at least one of the edges of the interlayer 10. In some cases, the ratio of the length of the tapered zone 16 to the length of the interlayer 10 (measured between the thinnest 14 and thickest edges 12 of the interlayer 10) can be at least about 0.10:1, at least about 0.15:1, at least about 0.20:1, at least about 0.25:1, at least about 0.30:1, at least about 0.35:1, at least about 0.40:1, at least about 0.45:1, at least about 0.50:1, at least about 0.55:1, at least about 0.60:1, at least about 0.65:1, at least about 0.70:1, at least about 0.75:1, at least about 0.80:1, at least about 0.85:1, at least about 0.90:1, at least about 0.95:1, or at least about 0.99:1.

Alternatively, or in addition, the ratio of the length of the tapered zone 16 to the length of the interlayer 10 can be not more than about 0.99:1, not more than about 0.95:1, not more than about 0.90:1, not more than about 0.85:1, not more than about 0.80:1, not more than about 0.75:1, not more than about 0.70:1, not more than about 0.65:1, not more than about 0.60:1, not more than about 0.55:1, not more than about 0.50:1, not more than about 0.45:1, not more than about 0.40:1, not more than about 0.35:1, not more than about 0.30:1, not more than about 0.25:1, not more than about 0.20:1, not more than about 0.15:1, or not more than about 0.10:1.

Figure 6:
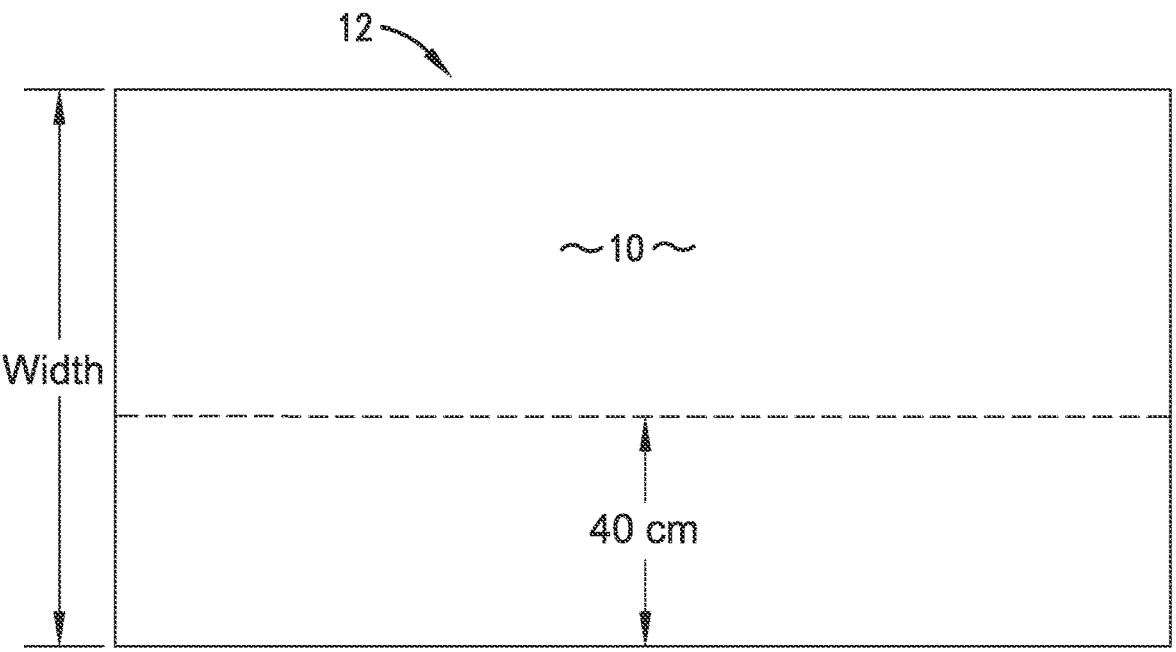
FIG. 6 is a schematic illustration of an interlayer according to embodiments of the present technology, particularly illustrating certain dimensions of the interlayer.

In some embodiments, the tapered zone 16 makes up at least about 10, at least about 15, at least about 20, at least about 25, at least about 30, at least about 35, at least about 40, at least about 45, or at least about 50 percent and/or not more than about 99, not more than about 95, not more than about 90, not more than about 85, not more than about 80, not more than about 75, not more than about 70, not more than about 65, not more than about 60, not more than about 55, or not more than about 50 percent of the total width (vertical direction, as shown in FIG. 6) of the interlayer 10. One example of an interlayer having a tapered zone 16 smaller than the entire width of the interlayer 10 is shown in FIG. 1c.

In some embodiments, the distance between the thinnest 14 and thickest edge 12 of the interlayer 10 (or tapered zone 16) may be at least about 50, at least about 55, at least about 60, at least about 65, at least about 70, at least about 75, at least about 80, at least about 85, at least about 90, at least about 95, at least about 100, at least about 110, at least about 120, at least about 130, at least about 140, at least about 150, at least about 160, at least about 170, at least about 180, at least about 190, or at least about 200 cm and/or not more than about 750, not more than about 700, not more than about 650, not more than about 600, not more than about 550, not more than about 500, not more than about 450, not more than about 400, not more than about 350, not more than about 300, not more than about 250, not more than about 200, or not more than about 150 cm.

In some embodiments, the length of the tapered zone 16 (measured in a direction perpendicular to the width of the interlayer shown in FIG. 6) is at least about 35, at least about 40, at least about 45, at least about 50, at least about 55, at least about 60, at least about 65, at least about 70, at least about 75, at least about 80, at least about 85, at least about 90, at least about 95, or at least about 100 cm and/or not more than about 200, not more than about 190, not more than about 180, not more than about 170, not more than about 160, not more than about 150, not more than about 140, not more than about 130, not more than about 120, not more than about 110, or not more than about 100 cm.

In some embodiments when the tapered zone 16 does not extend across the entire width of the interlayer 10, the distance between the boundaries of the tapered zone 16 can be at least about 5, at least about 10, at least about 15, at least about 20, at least about 25, at least about 30, at least about 35, at least about 40, or at least about 45 cm and/or not more than about 200, not more than about 175, not more than about 150, not more than about 100, or not more than about 75 cm. The width of the tapered zone 16 (measured between the thinnest and thickest edges 14, 12 of the tapered zone 16 in a direction parallel to the width of the interlayer 10 shown in FIG. 6) can be at least about 60, at least about 65, at least about 70, at least about 75, at least about 80, at least about 85, at least about 90, at least about 95, or at least about 100 mm and/or not more than about 150, not more than about 140, not more than about 130, not more than about 120, not more than about 110, not more than about 100, not more than about 90, not more than about 80, or not more than about 70 mm. The tapered zone 16 (or interlayer 10) may comprise a minimum thickness ($T_{zmin}$), measured at the thinner end of the tapered zone 16 (or interlayer 10), and a maximum thickness ($T_{zmax}$), measured at the thicker end of the tapered zone 16 (or interlayer 10). In some embodiments, $T_{zmin}$ can be at least about 0.25, at least about 0.30, at least about 0.35, at least about 0.38, at least about 0.40, at least about 0.45, at least about 0.50, at least about 0.55, at least about 0.60 mm and/or not more than about 2.5, not more than about 2.4, not more than about 2.3, not more than about 2.2, not more than about 2.1, not more than about 2.0, not more than about 1.9, not more than about 1.8, not more than about 1.7, not more than about 1.6, not more than about 1.5, not more than about 1.4, not more than about 1.3, not more than about 1.2, not more than about 1.1, not more than about 1.0, not more than about 0.9, not more than about 0.85, or not more than about 0.80 mm.

$T_{zmax}$ can be at least 0.13, at least about 0.15, at least about 0.20, at least about 0.25, at least about 0.30, at least about 0.35, at least about 0.40, at least about 0.45, at least about 0.50, at least about 0.55, at least about 0.60, at least about 0.65, at least about 0.70, at least about 0.75, at least about 0.80, at least about 0.85, at least about 0.90, at least about 0.95, or at least about 1.0 mm thicker than $T_{zmin}$. Alternatively, or in addition, $T_{zmax}$ can be not more than about 2.0, not more than about 1.9, not more than about 1.8, not more than about 1.7, not more than about 1.6, not more than about 1.5, not more than about 1.4, not more than about 1.3, not more than about 1.2, not more than about 1.1, or not more than about 1.0 mm thicker than $T_{zmin}$.

$T_{zmax}$ can be at least about 0.35, at least about 0.38, at least about 0.40, at least about 0.45, at least about 0.50, at least about 0.53, at least about 0.55, at least about 0.60, at least about 0.65, at least about 0.70, at least about 0.75, or at least about 0.76 mm and/or not more than 2.5, not more than about 2.4, not more than about 2.3, not more than about 2.2, not more than about 2.1, not more than about 2, not more than about 1.9, not more than about 1.8, not more than about 1.7, not more than about 1.6, or not more than about 1.5 mm.

When the interlayer 10 is a wedged interlayer, the tapered zone 16 may include at least one wedge angle (Θ), which is defined as the angle formed between a first reference line extending between two points of the interlayer where the first and second tapered zone boundaries intersect a first (upper) surface of the interlayer and a second reference line extending through two points where the first and second tapered zone boundaries intersect a second (lower) surface of the interlayer, as generally shown in FIG. 1b. In certain embodiments, the tapered zone 16 can have at least one wedge angle of at least about 0.05, at least about 0.10, at least about 0.13, at least about 0.15, at least about 0.20, at least about 0.25, at least about 0.30, at least about 0.35, or at least about 0.40 milliradians (mrad) and/or not more than about 1.0, not more than about 0.90, not more than about 0.85, not more than about 0.80, not more than about 0.75, not more than about 0.70, not more than about 0.65, or not more than about 0.60 mrad.

In some embodiments, the interlayer 10 has an overall wedge angle of at least about 0.3, at least about 0.35, at least about 0.40, at least about 0.45, at least about 0.50, at least about 0.55, at least about 0.60, at least about 0.65, at least about 0.70, at least about 0.75 mrad and/or not more than about 0.80, not more than about 0.75, not more than about 0.70, not more than about 0.65, not more than about 0.60, not more than about 0.55, not more than about 0.50, not more than about 0.45, not more than about 0.40, not more than about 0.35, not more than about 0.30 mrad.

In some embodiments, the wedge angle of the interlayer 10 may be a constant wedge angle that does not change across the tapered zone, while, in other embodiments, the tapered zone may include at least two constant angle zones having different wedge angles. In such cases, the tapered zone may have a linear thickness profile. In some embodiments, the wedge angle may vary continuously throughout all or a part of the tapered zone thereby providing a variable angle zone having a curved thickness profile. Specific embodiments of interlayers having different tapered zone configurations are described in detail in U.S. Patent Application Publication No. 2017/0285339, the entirety of which is incorporated herein by reference to the extent not inconsistent with the present disclosure.

Figure 5:
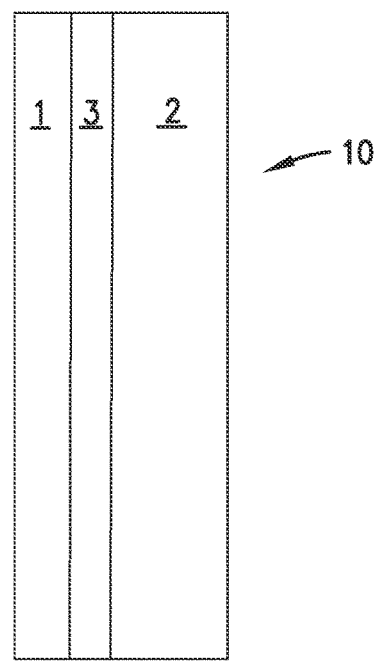
FIG. 5 is a vertical cross-section of an interlayer according to embodiments of the present technology, particularly illustrating one example of an interlayer having skin layers of different thicknesses.

In some embodiments, at least one layer or at least a portion of the interlayer 10 may be flat such that, for example, at least about 90, at least about 92, at least about 95, at least about 97, at least about 99, or all of the vertical cross-section of the layer or interlayer has a uniform thickness. That is, the interlayer 10 may have a cross-sectional geometry which remains at the same thickness. One example of a flat interlayer is shown in FIG. 5, and another is illustrated in FIG. 12f. An interlayer having a flat or constant thickness profile may have a wedge angle of approximately zero, or less than 0.05 mrad.

In some embodiments, the interlayer 10 may include at least one flat zone 18. As generally shown in FIG. 1c, a flat zone 18b of the interlayer 10 may be located adjacent to the thickest edge 12 of the tapered zone 16 and can, for example, have an average thickness within about 20, within about 15, within about 10, within about 5, within about 2, or within about 1 percent of the thickness of the thickest edge 12 of the tapered zone 16. Additionally, or in the alternative, the interlayer may have a flat zone 18a located adjacent the thinnest edge 14 of the tapered zone 16 that can have an average thickness within about 20, within about 15, within about 10, within about 5, within about 2, or within about 1 percent of the thickness of the thinnest edge 14 of the tapered zone 16. In some embodiments, the flat zone (or zones 18a,b) of the interlayer can make up at least about 5, at least about 10, at least about 15, at least about 20, at least about 25, at least about 30, at least about 35, or at least about 40 percent and/or not more than about 85, not more than about 80, not more than about 75, not more than about 70, not more than about 65, not more than about 60, not more than about 55, or not more than about 50 percent of the total length (vertical height) of the interlayer. Although shown in FIG. 1c as including both a thin and thick flat zone 18a,b, it should be understood that interlayers according to embodiments of the present invention can include one or the other or both of thin and thick flat zones 18a,b.

As shown in the embodiments of multi-layer interlayers depicted in FIGS. 1-5, the third polymeric layer 3 may be located between the first polymeric layer 1 and second polymeric layer 2. The third layer may be referred to as a "core" or "inner" layer and the outer polymeric layers 1 and 2 may be called "skin" or "outer" layers. When the interlayer comprises more than three layers, the outermost layers, such as, for example, the first and second layers shown in FIG. 2, may be referred to as the skin layers, while the innermost layer, such as, for example, the third layer shown in FIG. 2 may be referred to as the core layer.

In some embodiments, one or more of the skin or core layers may be wedge-shaped. In some cases, only the outer skin layers may be wedge-shaped, while the inner core layer may be flat or substantially flat. In other cases, one of the skin layers may be wedge-shaped, while the other may be flat. In some cases, both of the outermost skin layers and the innermost core layer may be wedge-shaped. In another case, the outer layers may be flat, while the inner core layer is wedged. In other cases, the outer skin layers may be wedge-shaped, while the inner core layer may be wedge-shaped or flat.

When one or more layers of the interlayer 10 are wedge-shaped, the layer may have a wedge angle of at least about 0.05, at least about 0.10, at least about 0.15, at least about 0.20, at least about 0.25, at least about 0.30, or at least about 0.35 milliradians and/or not more than about 1, not more than about 0.95, not more than about 0.90, not more than about 0.85, not more than about 0.80, not more than about 0.75, not more than about 0.70, not more than about 0.65, not more than about 0.60, not more than about 0.55 milliradians. When two or more of the layers are wedge-shaped, the layers can have substantially similar wedge angles within about 0.001, about 0.005, or within about 0.01 milliradians of one another. In some embodiments, the wedge angles of the two of the layers can be within about 15, within about 10, within about 5, within about 3, within about 2, or within about 1 percent of one another.

Alternatively, one or more of the wedged layers may have a different wedge angle than one or more others. For example, in some embodiments when the innermost core layer and at least one outer skin layer are both wedge-shaped, the core layer may have a wedge angle that is more or less than the wedge angle of the core layer (or layers). In some embodiments, the difference between wedge angles of two or more wedge-shaped layers may be at least about 0.05, at least about 0.075, at least about 0.10, or at least about 0.12 milliradians. In some embodiments, the wedge angles of two of the layers can be within more than 15, at least about 20, at least about 25, at least about 30, at least about 35, or at least about 40 percent of one another.

Overall, each of the layers of the multiple-layer interlayer 10 may have a thickness of at least about 0.05, at least about 0.10, at least about 0.15, at least about 0.20, at least about 0.25, at least about 0.30, at least about 0.35, or at least about 0.40 mm and/or not more than about 0.60, not more than about 0.55, not more than about 0.50, not more than about 0.45, not more than about 0.40, not more than about 0.35, or less than about 0.30 mm.

In some embodiments, when the interlayer 10 includes two or more wedge-shaped interlayers, the wedge-shaped layers can have a thick end and a thin end opposite the thick end. In some embodiments, the thick end of one or more of the wedge-shaped layers can have a thickness of at least about 5, at least about 6, at least about 7, at least about 8, at least about 9, at least about 10, at least about 11, at least about 12, at least about 13, at least about 14, at least about 15, at least about 16, at least about 17, at least about 18, at least about 19, at least about 20 mils and/or not more than about 50, not more than about 47, not more than about 45, not more than about 42, not more than about 40, not more than about 37, not more than about 35, not more than about 34, not more than about 33, not more than about 32, not more than about 31, not more than about 30, not more than about 29, not more than about 28, not more than about 27, not more than about 26, not more than about 25, not more than about 24, not more than about 23, not more than about 22, not more than about 21, not more than about 20 mils.

Additionally, or in the alternative, the thin end of one or more of the wedge-shaped layers can have a thickness of at least about 5, at least about 6, at least about 7, at least about 8, at least about 9, at least about 10, at least about 11, at least about 12, at least about 13, at least about 14, at least about 15, at least about 16, at least about 17, at least about 18, at least about 19, at least about 20 mils and/or not more than about 35, not more than about 34, not more than about 33, not more than about 32, not more than about 31, not more than about 30, not more than about 29, not more than about 28, not more than about 27, not more than about 26, not more than about 25, not more than about 24, not more than about 23, not more than about 22, not more than about 21, not more than about 20 mils.

In some embodiments, one or more of the layers may have a different thickness than one or more of the other layers. For example, at least one of the outer skin layers may be thicker than the inner core layer, as shown in FIGS. 1-5. When layers are present in addition to the skin and core layers, as shown in FIG. 2, the additional layers may be thinner than the skin and core layers. In some cases, none of the layers may have the same thickness, as shown in FIGS. 1-5, while in other embodiment, at least two of the layers may have similar thicknesses. As used herein, "similar thickness" means having a thickness (average or nominal) within 0.02 mm of another layer. As used herein, "different thickness" means having a thickness (average, nominal, or at a point) that is more than 0.02 mm higher or lower than another thickness.

In some embodiments, the outer skin layers (shown as layers 1 and 2 in FIGS. 1-5) may have similar thicknesses such that, for example, the maximum difference between the thicknesses of the two outer layers is not more than about 5, not more than about 3, not more than about 2, not more than about 1, or not more than about 0.5 percent. In some cases, the two outer skin layers may have the same nominal thickness.

In other embodiments, at least a portion of one outer skin layer 1 or 2 may be thicker than at least a portion of the other outer skin layer 2 or 1. For example, in some embodiments, one of the outer skin layers 1 or 2 may be at least about 5, at least about 10, at least about 15, at least about 20, at least about 25, at least about 30, at least about 35, at least about 40, at least about 45, or at least about 50 percent thicker than the other outer skin layer at one or more locations on the interlayer. Alternatively, or in addition, at least a portion of one outer skin layer 1 or 2 may be not more than 90, not more than about 85, not more than about 80, not more than about 75, not more than about 70, not more than about 65, not more than about 60, not more than about 55, not more than about 50, or not more than about 45 percent thicker than the other outer skin layer 1 or 2 at one or more locations along the interlayer.

In some embodiments, at one or more locations on the interlayer 10, one of the outer skin layers 1 or 2 may have a thickness of less than 0.30, not more than about 0.29, not more than about 0.28, not more than about 0.27, not more than about 0.26, not more than about 0.25, not more than about 0.24, not more than about 0.23, not more than about 0.22, not more than about 0.21, not more than about 0.20, not more than about 0.19, not more than about 0.18, not more than about 0.17, or not more than about 0.16 mm. Additionally, or in the alternative, at one or more locations on the interlayer, one of the outer skin layers 1 or 2 may have a thickness of at least about 0.20, at least about 0.22, at least about 0.24, at least about 0.26, at least about 0.28, or at least about 0.29 mm. In some cases, at one or more locations on the interlayer, at least one of the outer skin layers 1 or 2 can have a thickness in the range of from about 0.20 to 0.30 mm, at least about 0.22 to about 0.30 mm, or about 0.24 to about 0.29 mm.

In some embodiments, when one of the outer skin layers 1 or 2 has a thickness of less than 0.30 mm, the other outer skin layer 2 or 1 may have a thickness greater than 0.3 mm, or at least about 0.31, at least about 0.32, at least about 0.33, at least about 0.34, at least about 0.35, or at least about 0.36 mm at one or more locations on the interlayer.

In some embodiments, across at least about 10, at least about 20, at least about 40, at least about 60, at least about 80, or 100 percent of the total area of said interlayer, one of the outer skin layers 1 or 2 may have a thickness of less than about 0.30, less than about 0.29, less than about 0.28, less than about 0.27, less than about 0.26, or less than about 0.25 mm, while the other outer skin layer 2 or 1 may have a thickness greater than about 0.30, at least about 0.31, at least about 0.32, at least about 0.34, or at least about 0.35 mm.

According to some embodiments, one of the outer skin layers 1 or 2 of the interlayer can be at least about 0.01, at least about 0.025, at least about 0.05, at least about 0.075, at least about 0.10, at least about 0.12, at least about 0.15, at least about 0.17, at least about 0.20, at least about 0.22, at least about 0.25, or at least about 0.27 mm thicker (or thinner) than the other skin layer 2 or 1. Additionally, or in the alternative, one of the outer skin layers 1 or 2 may be not more than about 0.40, not more than about 0.39, not more than about 0.38, not more than about 0.37, not more than about 0.36, not more than about 0.35, not more than about 0.34, not more than about 0.33, not more than about 0.32, not more than about 0.31, not more than about 0.30, or not more than about 0.29 mm thicker (or thinner) than the other outer skin layer 2 or 1.

In some embodiments, at one or more locations on the interlayer, the ratio of the thickness of one of the outer skin layers 1 or 2 to the thickness of the other outer skin layer 2 or 1 may be not more than 2.5:1, not more than about 2.2:1, not more than about 2.0:1, not more than about 1.8:1, not more than about 1.6:1, or not more than about 1.5:1. The above differences in thickness between the two outer skin layers 1 or 2 may be differences in average thickness over the vertical cross-section of the interlayer, or may be differences in the nominal thicknesses of the layers. In other embodiments, particularly when the interlayer is a wedged interlayer, the differences above may refer to differences in maximum thickness or to differences in thickness at a certain distance from one of the edges of the interlayer.

In some embodiments, the combined thickness of the two outermost skin layers 1 or 2 can be at least about 20, at least about 22, at least about 25, at least about 27, at least about 28, at least about 30, at least about 32, at least about 35, at least about 37, at least about 40, at least about 42, or at least about 45 mils and/or not more than about 55, not more than about 53, not more than about 50, not more than about 47, not more than about 45, not more than about 42, not more than about 40, not more than about 37, not more than about 35, not more than about 32, or not more than about 30 mils at one or more locations, or on average, within the interlayer 10 or tapered zone 16.

When at least one of the skin layers 1 or 2 is a wedge-shaped layer, the combined skin thickness at the thinnest edge of the tapered zone 16 (or interlayer 10) can be at least about 20, at least about 22, at least about 25, at least about 27, at least about 28) and/or not more than about 40, not more than about 37, not more than about 35, not more than about 32, or not more than about 30 mils. Alternatively, or in addition, the combined thickness of the outermost two skin layers 1 or 2 at the thickest edge of the tapered zone 16 (or interlayer 10) can be at least about 30, at least about 32, at least about 35, at least about 37, at least about 40, at least about 42, at least about 45 mils and/or not more than about 55, not more than about 53, not more than about 50, not more than about 47, not more than about 45, not more than about 42 mils.

When the interlayer 10 has an overall wedged shape, the ratio of the combined thickness of the skin layers 1 or 2 at the thickest edge 12 of the tapered zone 16 (or interlayer 10) to the combined thickness of the skin layers 1 or 2 at the thinnest edge 14 of the tapered zone 16 (or interlayer 10) can be at least about 1.1:1, at least about 1.2:1, at least about 1.25:1, at least about 1.3:1, at least about 1.35:1, at least about 1.4:1, at least about 1.45:1, at least about 1.5:1 and/or not more than about 1.8:1, not more than about 1.75:1, not more than about 1.7:1, not more than about 1.65:1, not more than about 1.6:1, not more than about 1.55:1, not more than about 1.5:1, not more than about 1.45:1, not more than about 1.4:1.

In some embodiments, the ratio of the innermost core layer 3 to the combined thickness of the outermost two skin layers 1 or 2 at the thinnest edge 14 of the tapered zone 16 (or interlayer 10) can be at least about 0.05:1, at least about 0.075:1, at least about 0.10:1, at least about 0.125:1 and/or not more than about 0.25:1, not more than about 0.22:1, not more than about 0.20:1, not more than about 0.175:1. In some embodiments, the ratio of the thickness of the innermost core layer 3 to the combined thickness of the outer two skin layers 1 or 2 at the thickest edge 12 of the tapered zone 16 (or interlayer 10) can be at least about 0.05:1, at least about 0.075:1, at least about 0.10:1, at least about 0.125:1, at least about 0.15:1, at least about 0.175:1, at least about 0.20:1, at least about 0.22:1, at least about 0.25:1 and/or not more than about 0.35:1, not more than about 0.32:1, not more than about 0.30:1, not more than about 0.27:1, not more than about 0.25:1, not more than about 0.22:1, not more than about 0.20:1, not more than about 0.175:1, not more than about 0.15:1, not more than about 0.125:1, not more than about 0.10:1.

In some embodiments, the core layer 3 may be thinner than one or both of the outer skin layers 1 or 2. For example, across at least about 25, at least about 50, at least about 75, at least about 95, or 100 percent of the total area of the interlayer 10 the core layer 3 may be thinner than at least one (or both) of the outer skin layers 1 or 2. For example, in some embodiments, across at least about 25, at least about 50, at least about 75, at least about 95, or 100 percent of the total area of the interlayer 10, one of the outer skin layers 1 or 2 may be thinner than the other outer skin layer 2 or 1 and may, for example, be at least about 10, at least about 15, at least about 20, at least about 25, at least about 30, at least about 35, at least about 40, at least about 45, at least about 50, at least about 55, or at least about 60 percent thicker (or thinner) than the other outer skin layer 2 or 1.

In some embodiments, across at least about 25, at least about 50, at least about 75, at least about 95, or 100 percent of the total area of the interlayer 10, one of the outer skin layers 1 or 2 may be at least about 0.01, at least about 0.025, at least about 0.05, at least about 0.075, at least about 0.1, or at least about 0.15 mm thinner than the other outer skin layer 2 or 1. Additionally, or in the alternative, one of the skin layers 1 or 2 may be not more than about 0.5, not more than about 0.45, not more than about 0.40, not more than about 0.35, not more than about 0.30, not more than about 0.25, not more than about 0.20, or not more than about 0.15 mm thinner than the other outer skin layer 2 or 1. This difference in thickness may be difference in average thickness, nominal thickness, or, in the case of a wedged interlayer 10, this difference could be a difference in the maximum thickness or the thickness at a specified location.

Turning now to FIGS. 12a-e, several additional wedge-shaped interlayers 10 configured according to embodiments of the present technology are shown. In particular, in the interlayers illustrated in FIGS. 12a-e, the thickness of one of the outer polymeric layers (shown in FIGS. 12a-e as the first polymeric layer "1") can be greater at the thinnest edge 14 of the tapered zone 16 (or interlayer 10) than it is at the thickest edge 12 of the tapered zone 16 (or interlayer 10). In other words, the thick end of the wedge-shaped first layer 1 may be located at the thinnest edge 14 of the tapered zone 16, while the thin end of the first layer 1 may be located at the thickest edge 12 of the tapered zone 16.

Such a configuration is referred to herein as a "reverse wedge" profile. It should be understood that while described with respect to the first polymeric layer herein, the dimensions and configurations of embodiments of the present technology similarly apply to the second layer 2, depending on the configuration of the interlayer.

Additional embodiments of interlayers 10 shown in FIGS. 12f and 12g depict other embodiments according to the present technology wherein the overall interlayer is not wedge-shaped (FIG. 12f) or where all three layers are wedged, and the thinner end of the core layer 3 is located at the thickest edge 14 of the tapered zone 16 or interlayer 10 (FIG. 12g).

In one or more embodiments, the thickness of the first polymeric layer 1 at the thinnest edge 14 of the tapered zone 16 (or interlayer 10) is at least 0.05, at least about 0.10, at least about 0.15, or at least about 0.20 mm and/or not more than about 0.3, not more than about 0.25, not more than about 0.20, or not more than about 0.15 mm greater than the thickness of the first polymeric layer 1 at the thickest edge 12 of the tapered zone 16 (or interlayer 10). As a result, the first polymer layer 1 in the interlayers 10 shown in FIGS. 12a-e have a generally "reverse" wedge-shaped profile.

Figure 12A:
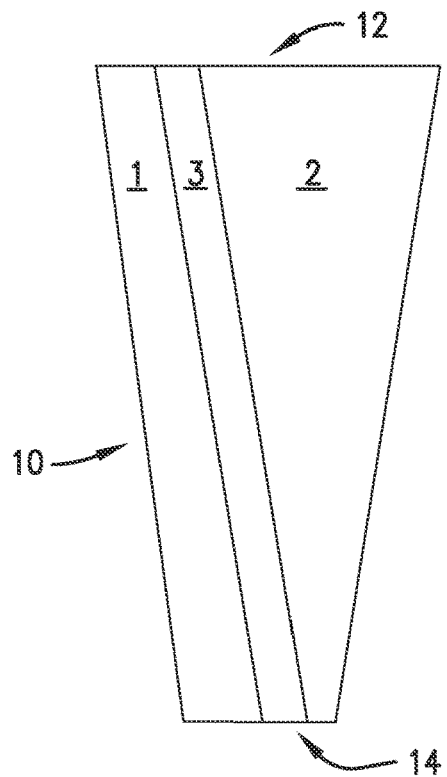
FIG. 12a is a vertical cross-section of a wedge-shaped interlayer according to embodiments of the present technology, particularly illustrating an example of an interlayer with a skin layer having a reverse wedge configuration.
Figure 12B:
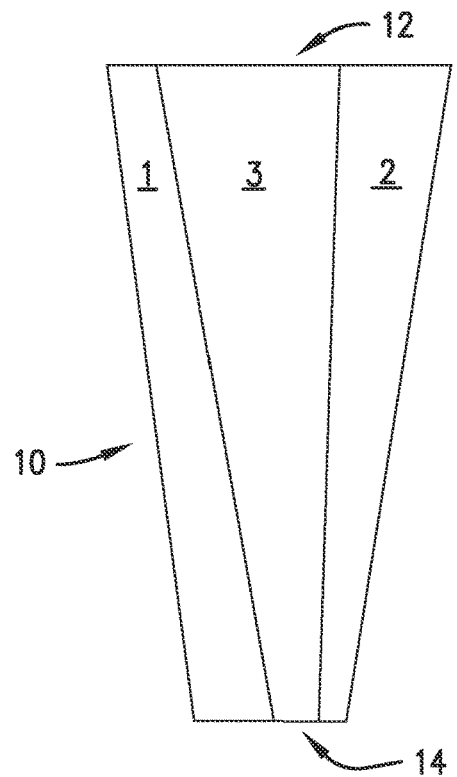
FIG. 12b is a vertical cross-section of a wedge-shaped interlayer according to embodiments of the present technology, particularly illustrating another example of an interlayer with a skin layer having a reverse wedge configuration.
Figure 12C:
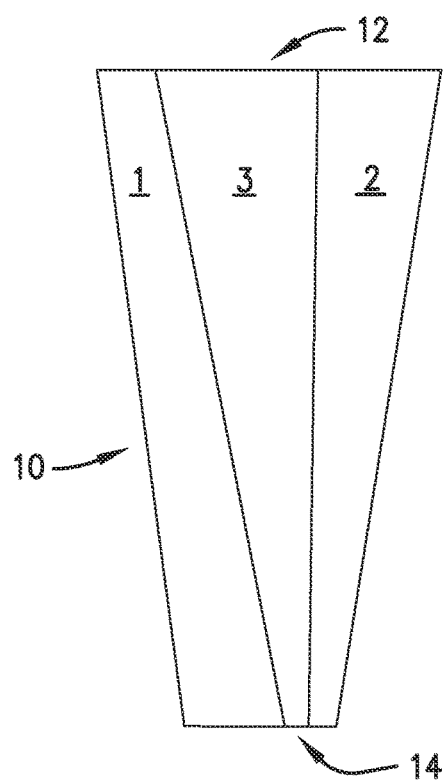
FIG. 12c is a vertical cross-section of a wedge-shaped interlayer according to embodiments of the present technology, particularly illustrating yet another example of an interlayer with a skin layer having a reverse wedge configuration.
Figure 12D:
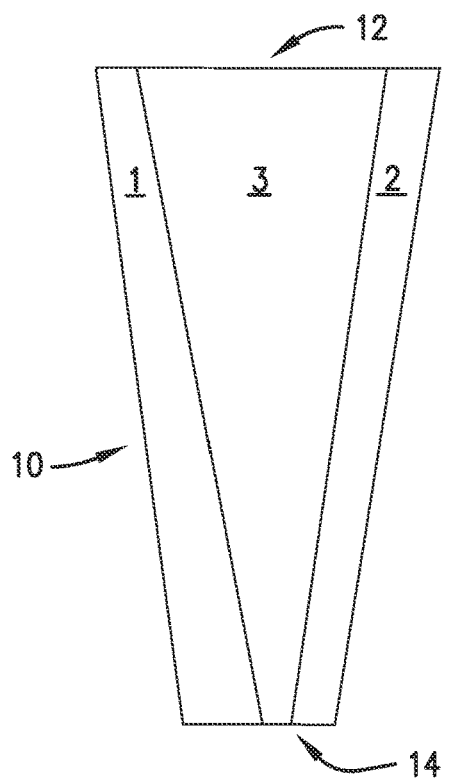
FIG. 12d is a vertical cross-section of a wedge-shaped interlayer according to embodiments of the present technology, particularly illustrating still another example of an interlayer with a skin layer having a reverse wedge configuration.
Figure 12E:
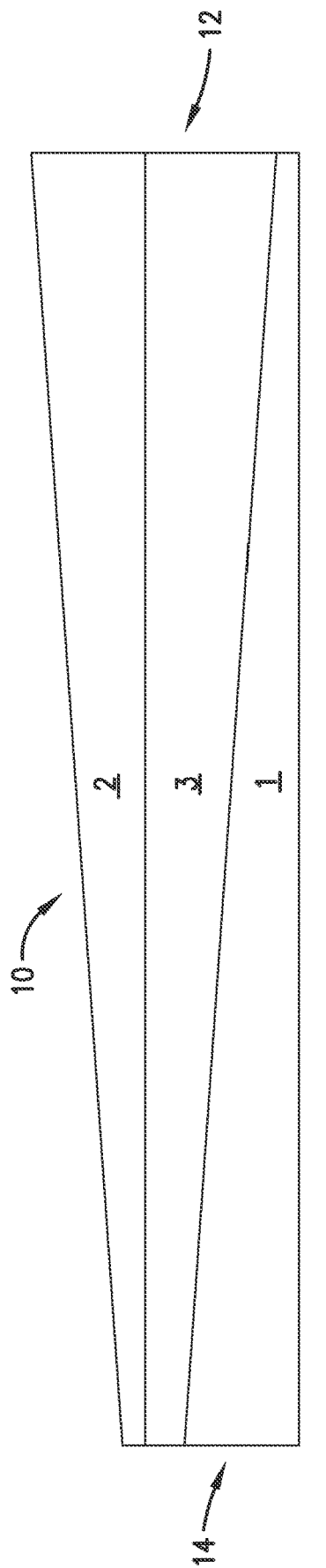
FIG. 12e is a vertical cross-section of a wedge-shaped interlayer according to embodiments of the present technology, particularly illustrating a further example of an interlayer with a skin layer having a reverse wedge configuration.
Figure 12F:
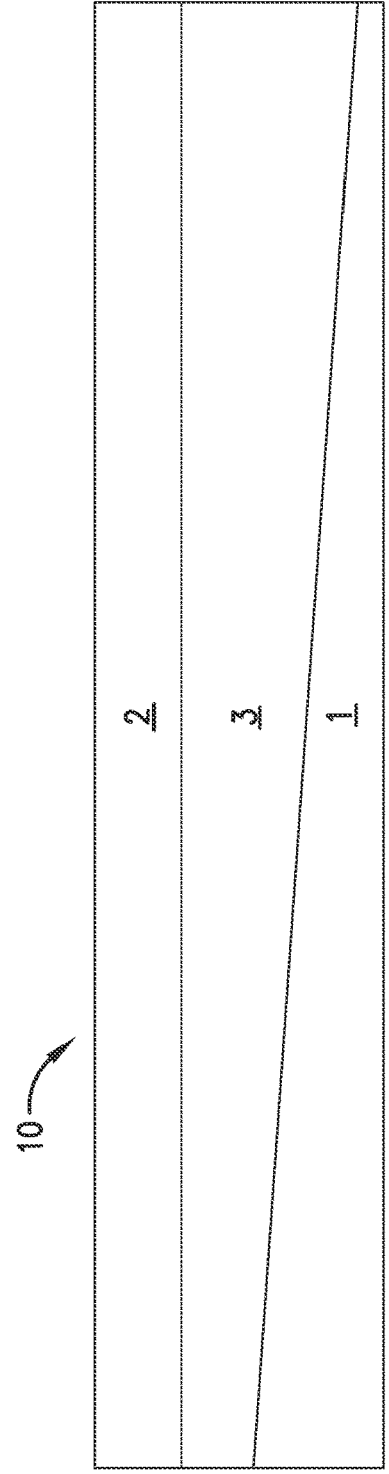
FIG. 12f is a vertical cross-section of an shaped interlayer according to embodiments of the present technology, particularly illustrating a still further example of an interlayer with a skin layer having a reverse wedge configuration.
Figure 129:
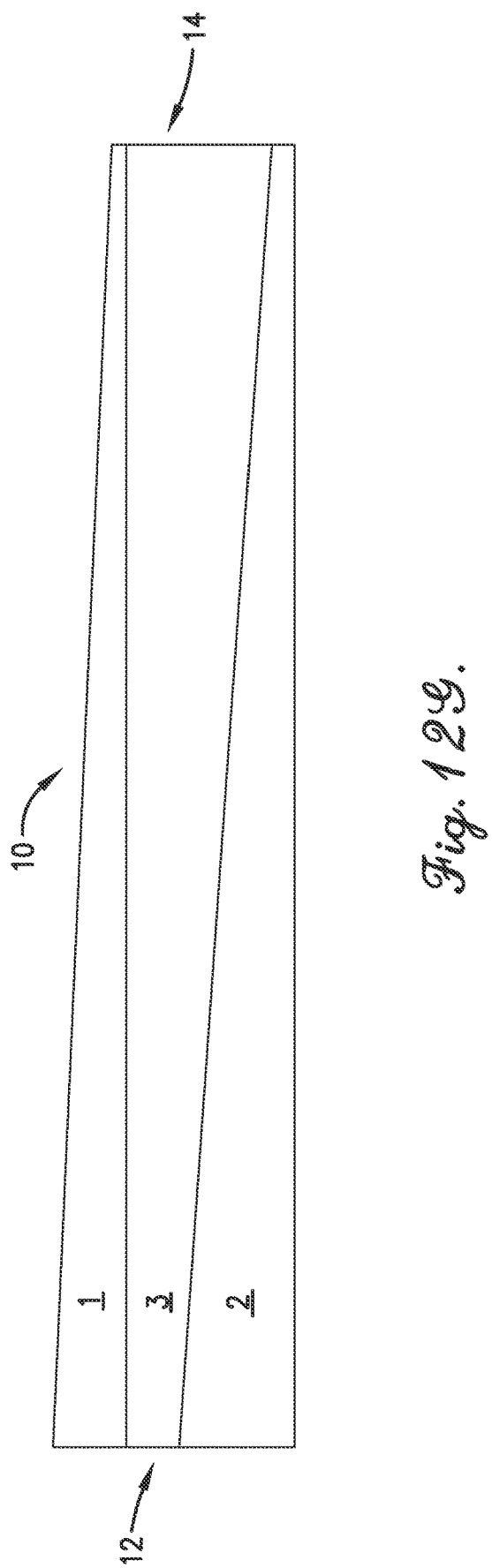

In some embodiments, examples of which are illustrated in FIGS. 12a-c, the other outer layer (shown in FIGS. 12a-c as the second polymer layer "2") may also have a wedged shape and may have a thickness at the thinnest edge 14 of the tapered zone 16 (or interlayer 10) that is less than its thickness at the thickest edge 12 of the tapered zone 16 (or interlayer 10). In one or more embodiments, the thickness of the second polymeric layer 2 at the thinnest edge 14 of the tapered zone 16 (or interlayer 10) can be at least 0.05, at least about 0.10, at least about 0.15, or at least about 0.20 mm and/or not more than about 0.3 mm, not more than about 0.25, not more than about 0.20, or not more than about 0.15 mm thinner than the thickness of the second polymeric layer 2 at the thickest edge 14 of the tapered zone 16 (or interlayer 10). As a result, the second polymeric layer 2 can have a wedge-shaped profile similar to the wedge-shaped profile of the tapered zone 16 or overall interlayer 10. In some embodiments, as shown in FIGS. 12d and 12f, for example, the second polymer layer 2 can be a flat layer having a substantially uniform (non-tapered) profile and a substantially constant thickness.

In one or more embodiments, the one of the outer polymeric layers 1 or 2 may be thinner, overall, than the other outer polymeric layer 2 or 1. For example, the one polymeric layer 1 or 2 may have an average thickness that is at least about 0.05, at least about 0.075, at least about 0.10, at least about 0.15, or at least about 0.2 mm and/or not more than about 0.25, not more than about 0.20, not more than about 0.15, not more than about 0.10, not more than about 0.075, or not more than about 0.05 mm less than the average thickness of the other polymeric layer 2 or 1. As used herein, the term "average thickness" refers to the thickness of the layer or interlayer, measured at 10 evenly spaced locations across the entire vertical height of the interlayer and then averaged (i.e., divided by 10).

In one or more embodiments, ratio of the mass of the first polymeric layer 1 to the total mass of the first and second polymeric layers 1 or 2 combined can be at least about 0.10:1, at least about 0.15:1, at least about 0.20:1, at least about 0.25:1, at least about 0.30:1, at least about 0.35:1, at least about 0.40:1, at least about 0.45:1, at least about 0.50:1 and/or not more than about 0.95:1, at least about 0.90:1, at least about 0.85:1, at least about 0.80:1, at least about 0.75:1, at least about 0.70:1, at least about 0.65:1, at least about 0.60:1, at least about 0.55:1, at least about 0.50:1, or at least about 0.45:1.

In one or more embodiments, the thickness of the first polymeric layer 1 can be greater than the thickness of the second polymeric layer 2 at the thinnest edge 14 of the tapered zone 16 (or interlayer 10). For example, the thickness of the first polymeric layer 1 at the thinnest edge 14 of the tapered zone 16 (or interlayer 10) is at least about 0.005, at least about 0.01, at least about 0.025, at least about 0.05, at least about 0.075 mm and/or not more than about 0.15, not more than about 0.125, not more than about 0.15, not more than about 0.15, or not more than about 0.075 mm greater than the thickness of the second polymeric layer 2 at the thinnest edge 14 of the tapered zone 16 (or interlayer 10).

In one or more embodiments, the ratio of the thickness of the first polymer layer 1 to the thickness of the second polymer layer 2 at the thinnest edge 14 of the tapered zone 16 (or interlayer 10) can be at least about 1.05:1, at least about 1.1:1, at least about 1.2:1, at least about 1.25:1, at least about 1.3:1, at least about 1.35:1, at least about 1.4:1, at least about 1.45:1, or at least about 1.5:1 and/or not more than about 5:1, not more than about 4.5:1, not more than about 4:1, not more than about 3.5:1, not more than about 3:1, not more than about 2.5:1, or not more than about 2:1.

In some embodiments, the ratio of the thickness of the first polymeric layer 1 to the thickness of the thinnest edge 14 of the tapered zone 16 (or interlayer 10) is at least 0.20:1, at least about 0.25:1, at least about 0.30:1, at least about 0.35:1, at least about 0.40:1, at least about 0.45:1, or at least about 0.50:1 and/or not more than 0.85:1, not more than about 0.80:1, not more than about 0.75:1, not more than about 0.70:1, not more than about 0.65:1, not more than about 0.60:1, not more than about 0.55:1, not more than about 0.50:1, not more than about 0.45:1 or not more than about 0.40:1.

In some embodiments, the ratio of the thickness of the second polymeric layer 2 to the thickness of the thinnest edge 14 of the tapered zone 16 (or interlayer 10) is at least about 0.1:1, at least about 0.15:1, at least about 0.20:1, at least about 0.25:1, at least about 0.30:1, at least about 0.35:1, or at least about 0.40:1 and/or not more than about 0.45:1, not more than about 0.40:1, not more than about 0.35:1, not more than about 0.30:1, or not more than about 0.25:1.

In some embodiments, the ratio of the thickness of the first polymeric layer 1 to the thickness of the second polymeric layer 2 at the thinnest edge 14 of the tapered zone 16 (or interlayer 10) can be at least about 0.10:1, at least about 0.15:1, at least about 0.20:1, at least about 0.25:1, at least about 0.30:1, at least about 0.35:1 and/or not more than about 0.75:1, not more than about 0.70:1, not more than about 0.65:1, not more than about 0.60:1, not more than about 0.55:1, not more than about 0.50:1, not more than about 0.45:1, not more than about 0.40:1, not more than about 0.35:1, The ratio of the thickness of the first polymeric layer 1 to the thickness of the second polymeric layer 2 at the thickest edge 12 of the tapered zone 16 (or interlayer 10) can be at least about 0.10:1, at least about 0.15:1, at least about 0.20:1, at least about 0.25:1, at least about 0.30:1, at least about 0.35:1 and/or not more than about 0.75:1, not more than about 0.70:1, not more than about 0.65:1, not more than about 0.60:1, not more than about 0.55:1, not more than about 0.50:1, not more than about 0.45:1, not more than about 0.40:1, or not more than about 0.35:1.

Additionally, or in the alternative, the thickness of the first polymeric layer 1 can be less than the thickness of the second polymeric layer 2 at the thickest edge 12 of the tapered zone 16 (or interlayer 10), as also generally shown in FIGS. 12a-e. For example, the thickness of the first polymeric layer 1 at the thickest edge 12 of the tapered zone 16 (or interlayer 10) can be at least about 0.05, at least about 0.10, at least about 0.15, at least about 0.20, or at least about 0.25 mm and/or not more than about 0.35, not more than about 0.30, not more than about 0.25, not more than about 0.20, not more than about 0.15, or not more than about 0.10 mm thinner than the thickness of the second polymeric layer 2 at the thickest part of the tapered zone 16 (or interlayer 10).

In one or more embodiments, the ratio of the thickness of the first polymeric layer 1 to the thickness of the second polymeric layer 2 at the thickest edge 12 of the tapered zone 16 (or interlayer 10) is at least about 0.10:1, at least about 0.15:1, at least about 0.2:1, at least about 0.25:1, at least about 0.30:1, at least about 0.35:1, at least about 0.4:1, at least about 0.5:1, at least about 0.6:1, or at least about 0.75:1 and/or not more than about 0.99:1, not more than about 0.95:1, not more than about 0.90:1, not more than about 0.85:1, not more than about 0.80:1, not more than about 0.75:1, not more than 0.70:1, not more than 0.65:1, not more than 0.55:1, not more than 0.50:1, not more than 0.45:1, not more than 0.40:1, not more than 0.35:1. In one or more embodiments, the ratio of the thickness of the second polymeric layer 2 to the thickness of the thickest edge 12 of the tapered zone 16 (or interlayer 10) is at least about 0.20:1, at least about 0.25:1, at least about 0.30:1, at least about 0.35:1, at least about 0.40:1, at least about 0.45:1, or at least about 0.50:1 and/or not more than about 0.85:1, not more than about 0.80:1, not more than about 0.75:1, not more than about 0.70:1, not more than about 0.65:1, not more than about 0.60:1, not more than about 0.55:1, not more than about 0.50:1, not more than about 0.45:1 or not more than about 0.40:1. In one or more embodiments, the ratio of the thickness of the first polymeric layer 1 to the thickness of the thickest edge 12 of the tapered zone 16 (or interlayer 10) is at least about 0.1:1 at least about 0.15:1, at least about 0.20:1, at least about 0.25:1, at least about 0.30:1, at least about 0.35:1, or at least about 0.40:1 and/or not more than 0.45:1, not more than about 0.40:1, not more than about 0.35:1, not more than about 0.30:1, or not more than about 0.25:1.

Additionally, in one or more embodiments, the third polymeric layer (shown as the innermost or core layer "3") in FIGS. 12*a-d*, may also be a wedge-shaped layer. In one or more embodiments, the thickness of the third polymeric layer 3 at the thinnest edge 14 of the tapered zone 16 (or interlayer 10) can be less than the thickness of the third polymer layer 3 at the thickest edge 12 of the tapered zone 16 (or interlayer 10). Accordingly, the third polymeric layer 3 can also have a wedge-shaped profile similar to the overall profile of the interlayer 10. In some embodiments, as shown in FIG. 12*a*, for example, the third polymer layer 3 can be a flat layer having a substantially uniform (non-tapered) profile.

In one or more embodiments, the ratio of the thickness of the third layer 3 at the thinnest edge 14 of the tapered zone 16 (or interlayer 10) to the thickness of the third layer 3 at the thickest edge 12 of the tapered zone 16 (or interlayer 10) is at least about 1:1, at least about 1.05:1, at least about 1.1:1, at least about 1.15:1, at least about 1.2:1, at least about 1.25:1, at least about 1.5:1, at least about 2:1, at least about 2.5:1, at least about 3:1, or at least about 3.5:1 and/or not more than about 5:1, not more than about 4.5:1, not more than about 4:1, not more than about 3.5:1, not more than about 3:1, not more than about 2.5:1, not more than about 2:1, not more than about 1.5:1, not more than about 1.25:1, not more than about 1.15:1, or not more than about 1:1, or it can be 1:1.

In one or more embodiments, the ratio of the thickness of the third polymeric layer 3 to the total thickness of the thickest edge 12 of the tapered zone 16 (or interlayer 10) is at least about 0.05:1, at least about 0.10:1, at least about 0.15:1, or at least about 0.20:1 and/or not more than about 0.40:1, not more than about 0.35:1, not more than about 0.30:1, not more than about 0.25:1, not more than about 0.20:1, not more than about 0.15:1, or not more than about 0.10:1. The ratio of the thickness of the third polymeric layer 3 to the total thickness of the thinnest edge 14 of the tapered zone 16 (or interlayer 10) can be at least about 0.05:1, at least about 0.10:1, at least about 0.15:1, at least about 0.20:1, at least about 0.25:1, at least about 0.30:1, at least about 0.35:1, at least about 0.40:1, at least about 0.45:1, at least about 0.50:1 and/or not more than about 0.80:1, not more than about 0.75:1, not more than about 0.70:1, not more than about 0.65:1, not more than about 0.60:1, not more than about 0.55:1, not more than about 0.50:1, not more than about 0.45:1, not more than about 0.35:1, not more than about 0.30:1, not more than about 0.25:1, not more than about 0.20:1, not more than about 0.15:1, or not more than about 0.10:1.

In one or more embodiments, the ratio of the thickness of the third polymeric layer 3 to the thickness of the first polymeric layer 1 at the thinnest edge 14 of the tapered zone 16 (or interlayer 10) can be at least about 0.05:1, at least about 0.10:1, at least about 0.15:1, at least about 0.20:1 and/or not more than about 0.50:1, not more than about 0.45:1, not more than about 0.40:1, not more than about 0.35:1, not more than about 0.30:1, not more than about 0.25:1, or not more than about 0.20:1. Additionally, or in the alternative, the ratio of the thickness of the third polymeric layer 3 to the thickness of the first polymeric layer 1 at the thickest edge 12 of the tapered zone 16 (or interlayer 10) can be at least about 0.40:1, at least about 0.50:1, at least about 0.60:1, at least about 0.70:1, at least about 0.80:1, or at least about 0.90:1 and/or not more than about 5:1, not more than about 4.5:1, not more than about 4:1, not more than about 3.5:1, not more than about 3:1, not more than about 2.5:1, not more than about 2:1, not more than about 1.5:1, not more than about 1.1:1, not more than about 0.90:1, not more than about 0.80:1, not more than about 0.75:1, or not more than about 0.50:1.

In some embodiments, the third layer 3 can have a thickness of at least about 3.5, at least about 4, at least about 4.5, at least about 5 mils and/or not more than about 10, not more than about 9, not more than about 8, not more than about 7, not more than about 6, not more than about 5 mils. In some embodiments, the thick end of the third layer 3 can have a thickness of at least about 3.5, at least about 4, at least about 4.5, at least about 5, at least about 5.5, at least about 6, at least about 6.5, at least about 7, at least about 7.5, at least about 8, or at least about 8.5 and/or not more than about 22.5, not more than about 20, not more than about 17, not more than about 15, not more than about 14, not more than about 13, not more than about 12, not more than about 11, not more than about 10, not more than about 9.5 mils. When the third layer 3 is flat, it can have an average thickness of at least about 3.5, at least about 4, at least about 4.5, at least about 5, at least about 5.5, at least about 6, at least about 6.5, at least about 7, at least about 7.5, at least about 8, or at least about 8.5) and/or not more than about 22.5, not more than about 20, not more than about 17, not more than about 15, not more than about 14, not more than about 13, not more than about 12, not more than about 11, not more than about 10, not more than about 9.5, not more than about 9, not more than about 8, not more than about 7, not more than about 6, or not more than about 5 mils.

Figure 7:
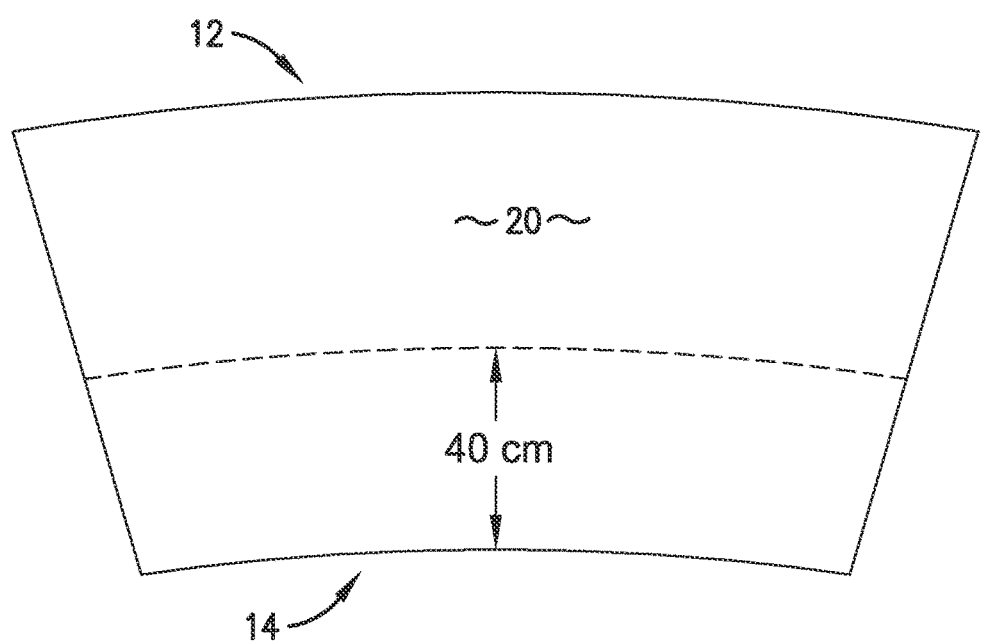
FIG. 7 is a schematic illustration of a laminated windshield according to embodiments of the present technology utilizing an interlayer as illustrated in FIG. 6.
Figure 8:
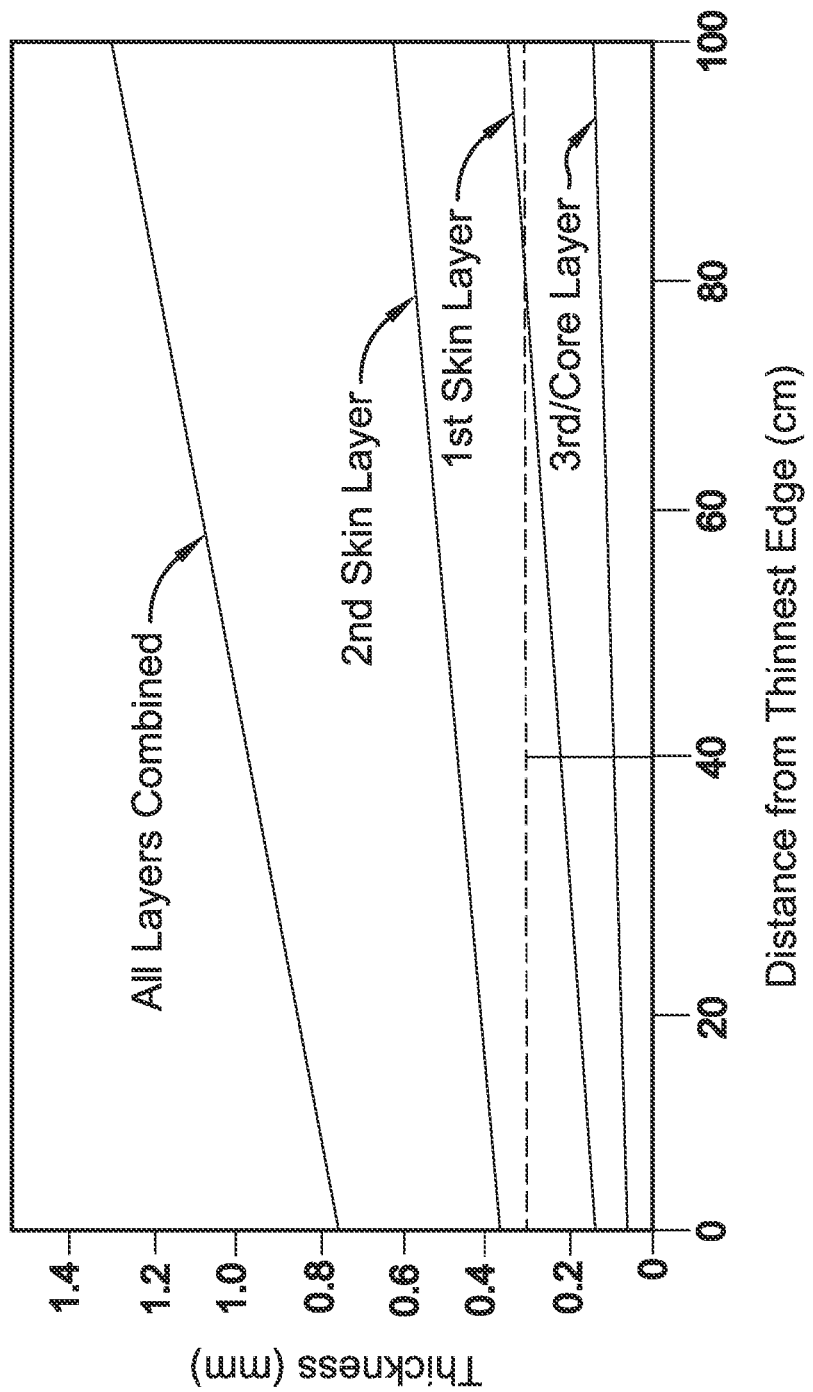
FIG. 8 is a graph illustrating the thicknesses of the first, second, and third polymeric layers and the overall interlayer thickness for an interlayer according to embodiments of the present technology, shown as a function of position.

Turning now to FIG. 8, a thickness profile of an interlayer 10 according to various embodiments of the present technology is shown. In some embodiments, an example of which is depicted in FIG. 8, at least one of the outer layers 1 or 2 of the interlayer (or both) may have a thickness that does not exceed a certain maximum thickness within a set distance from one of the edges of the interlayer. For example, in some embodiments, the thickness of at least one of the outer layers 1 or 2 may not exceed 0.3 mm within about 40 cm of the thinnest edge 14 of the interlayer, as shown graphically in FIG. 8 and schematically in FIG. 6 (as an interlayer) and FIG. 7 (as a laminated glazing or windshield).

In some cases, the maximum thickness of at least one of the outer layers 1 or 2 may not exceed 0.30, may not exceed 0.29, may not exceed 0.28, may not exceed 0.27, may not exceed 0.26, or may not exceed 0.25 mm within about 10, within about 20, within about 30, or within about 40 cm of the thinnest edge 14 of the tapered zone 16 (or interlayer 10). In some cases, the maximum thickness of at least one of the outer layers 1 or 2 may not exceed 0.30 mm within at least about 45, at least about 50, at least about 55, at least about 60, at least about 65, at least about 70, or at least about 75, or at least about 80 cm of the thinnest edge 14 of the tapered zone 16 (or interlayer 10). These ranges may also apply when the interlayer 10 is used to form a windshield 20, with the thinnest edge 14 located at the bottom (vertically as-installed) edge, as generally shown in FIG. 7.

Figure 9:
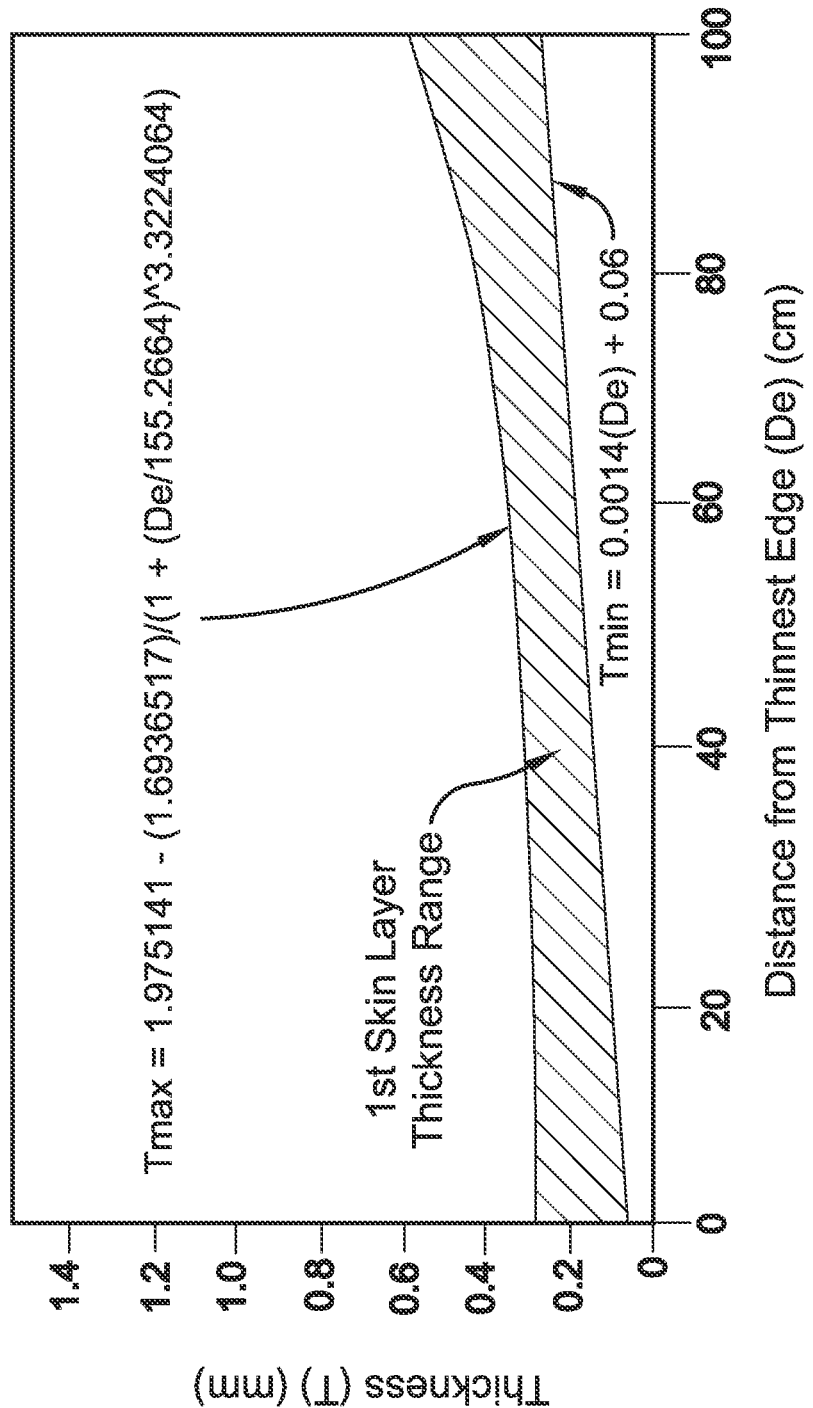
FIG. 9 is a graph illustrating the thickness range for a first layer of an interlayer according to embodiments of the present invention, shown as a function of position.

Turning now to FIG. 9, a thickness profile of at least one of the outer skin layers (or both) is shown graphically, with minimum and maximum thicknesses illustrated as a function of position. More particularly, FIG. 9 provides a graphical illustration of the maximum thickness (Tmax) applicable to at least one of the outer skin layers and a minimum thickness (Tmin) of the same outer layer. Thus, the shaded region between the curves shown in FIG. 9 represents the range of possible thicknesses for the outer layer, as a function of position for the first 100 cm of the interlayer, measured from its thinnest edge.

As shown in FIG. 9, the maximum thickness (Tmax) for the outer skin layer as a function of distance from the thinnest edge may be expressed by the following formula (1):

$$T\text{max} = 1.975141 - (1.6936517)/(1+(D_e/155.2664)^{3.324064}) \quad (1)$$

wherein De is the distance (in cm) from the thinnest edge of the interlayer.

The minimum thickness of the outer skin layer, also expressed as a function of the distance from the thinnest edge, may be expressed by formula (II) below:

$$T\text{min} = 0.0014 D_e + 0.06 \quad (II),$$

wherein De is the distance (in cm) from the thinnest edge of the interlayer. Alternatively, or in addition, the minimum thickness of the outer skin layer may also be represented by one of the other formulas (III) and (IV) below:

$$T\text{min} = 0.0024 D_e + 0.06 \quad (III);$$

$$T\text{min} = 0.002 D_e + 0.10 \quad (IV),$$

wherein De is the distance (in cm) from the thinnest edge of the interlayer. Each of formulas (II) through (IV) below are possible equations to represent the lower line showing Tmin in the thickness profile shown in FIG. 9, while formula (I) represents the upper line of Tmax as a function of position.

In some embodiments, at least one of the outer skin layers (or both) may have a thickness profile defined by the following formula (V):

$$[0.0024(D_e)+0.06] < T_1 < [1.975141-(1.6936517)/(1+(D_e/155.2664)^{3.324064})] \quad (V)$$

wherein De is the distance (in cm) from the thinnest edge of the interlayer, and wherein $T_1$ is the thickness (in mm) of the first layer at De. This corresponds to the shaded region in FIG. 9.

Figure 13:
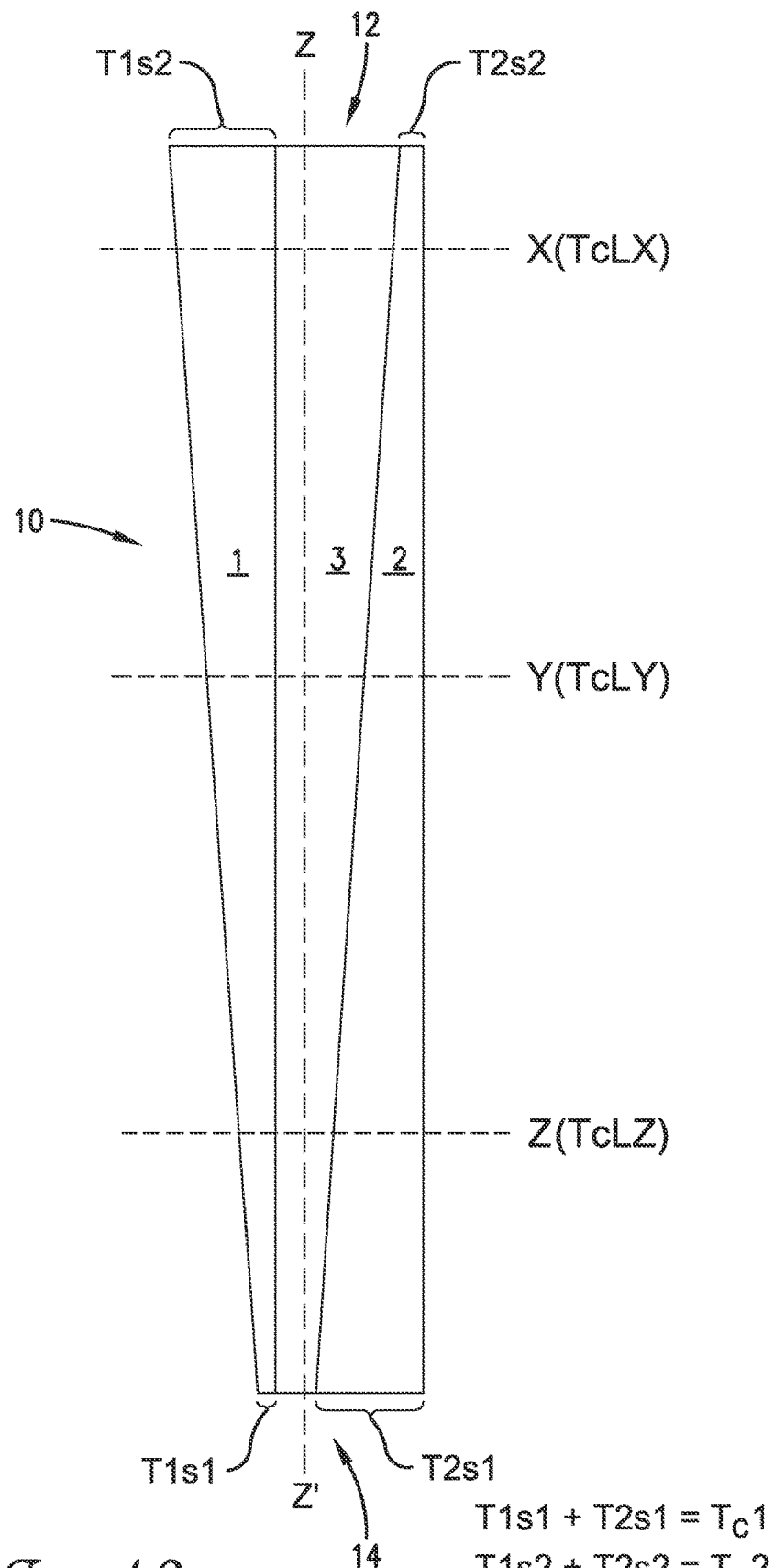
FIG. 13 is a vertical cross-section of a wedge-shaped interlayer according to embodiments of the present invention, particularly illustrating the combined skin thicknesses along the vertical dimension of the interlayer.

Turning now to FIG. 13, another embodiment of a wedge-shaped interlayer 10 according to embodiments of the present technology is provided. The wedge-shaped interlayer 10 shown in FIG. 13 includes a pair of skin layers (first and second layer 1 or 2) and a core layer (third layer 3). As described previously, use of "first," "second," "third," etc. are only for the purposes of facilitating discussion herein, and are not intended to be limiting, unless otherwise noted.

As shown in FIG. 13, the wedge-shaped interlayer 10 may be configured such that, at all points along a vertical centerline extending between the thinnest and thickest edges 14, 12 (shown by the dashed line Z-Z' in FIG. 13), the following relationship can be satisfied:

$$1.25 Tca > TcL > 0.75 Tca$$

wherein Tc1 is the local combined thickness of the first and second layers and Tca is the average combined thickness of the first and second layers calculated as follows:

$$Tca = (Tc1+Tc2)/2$$

wherein Tc1 is the combined thickness of the first and second layers 1 or 2 at the thinnest edge 14 and Tc2 is the combined thickness of the first and second layers 1 or 2 at the thickest edge 12. As illustrated in FIG. 13, Tc1 is calculated by adding the thickness of the first layer 1 at the thinnest edge 14 (shown as T1s1) and the thickness of the second layer 2 at the thinnest edge 14 (shown as T2s1), while Tc2 is calculated by adding the thickness of the first layer 1 at the thickest edge 12 (shown as T1s2) and the thickness of the second layer 2 at the thickest edge 12 (shown as T2s2). Formulas for Tc1 and Tc2 are shown below:

$$Tc1 = T1s1+T2s1 \quad \text{(thinnest edge)}$$

$$Tc2 = T1s2+T2s2 \quad \text{(thickest edge)}$$

For example, the combined local thicknesses of the first and second layers 1 or 2 at each of arbitrarily-selected points X, Y, and Z (shown as TcLX, TcLY, and TcLZ in FIG. 13) each fall within the range of 1.25 Tca and 0.75 Tca, wherein Tca is defined as above. Thus, in some embodiments, despite changes in the thicknesses of the individual skin layers at various locations along a vertical centerline of the interlayer, the combined thickness remains substantially constant and substantially similar to the average of the combined thicknesses at either end of the tapered zone 16 (or interlayer 10).

In some embodiments, Tca can be at least about 25, at least about 27, at least about 30, at least about 32, at least about 34, at least about 35, at least about 36 mils and/or not more than about 45, not more than about 42, not more than about 40, not more than about 38, not more than about 37, or not more than about 35 mils. Values for Tc1 and Tc2, as well as the combined thickness of the skin layers 1 or 2 along the vertical centerline as shown in FIG. 13, may also fall within one or more of the ranges provided herein.

In some embodiments, the average local combined thickness of the first and second layers 1 or 2 taken at 10 (20, 30, 40, 50, or 60) equally spaced points between the thinnest and thickest edges 14, 12 of the tapered zone 16 (Tcavg) can satisfy the following equation:

$$1.25 Tcavg > TcL > 0.75 Tcavg,$$

wherein TcL is the local combined thickness of the first and second layers 1 or 2. In some embodiments, the higher end of the range above can be not more than 1.2 Tcavg, 1.15 Tcavg, 1.1 Tcavg, or 1.05 Tcavg. In some embodiments, the lower end of the range can be at least 0.80 Tcavg, 0.85 Tcavg, 0.90 Tcavg, or 0.95 Tcavg. In some embodiments, the above equation can be satisfied at all points between the thinnest and thickest edges 14, 12 of the tapered zone 16.

Each of the layers of the multi-layer interlayer may be formed of at least one thermoplastic polymers. Examples of suitable thermoplastic polymers can include, but are not limited to, poly(vinyl acetal) resins, polyurethanes (PU), poly(ethylene-co-vinylacetate) (EVA), polyvinyl chlorides (PVC), polyvinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, the thermoplastic polymer can be selected from the group consisting of poly(vinyl acetal) resins, polyvinyl chloride, and polyurethanes, or the resin can comprise one or more poly(vinyl acetal) resins. Although described herein with respect to poly(vinyl acetal) resins and, in particular, poly(vinyl butyral) resins, it should be understood that one or more of the above polymer resins could be included with, or in the place of, the poly(vinyl acetal) resins described below in accordance with various embodiments of the present invention.

When the resin compositions, layers, and interlayers described herein include poly(vinyl acetal) resins, the poly(vinyl acetal) resins can be formed according to any suitable method. Poly(vinyl acetal) resins can be formed by acetalization of polyvinyl alcohol with one or more aldehydes in the presence of an acid catalyst. The resulting resin can then be separated, stabilized, and dried according to known methods such as, for example, those described in U.S. Pat. Nos. 2,282,057 and 2,282,026, as well as Wade, B. 2016, Vinyl Acetal Polymers, Encyclopedia of Polymer Science and Technology, 1-22 (online, copyright 2016 John Wiley & Sons, Inc.). The resulting poly(vinyl acetal) resins may have a total percent acetalization of at least about 50, at least about 60, at least about 70, at least about 75, at least about 80, at least about 85 weight percent, measured according to ASTM D-1396, unless otherwise noted. The total amount of aldehyde residues in a poly(vinyl acetal) resin can be collectively referred to as the acetal component, with the balance of the poly(vinyl acetal) resin being residual vinyl alcohol (hydroxyl) and residual acetate groups, which will be discussed in further detail below.

In some embodiments, at least one, or all, of the layers of the multi-layer interlayer may comprise at least one poly(vinyl acetal) resin in an amount of at least about 0.5, at least about 1, at least about 2, at least about 3, at least about 5, at least about 10, at least about 15, at least about 20, at least about 30, at least about 40, at least about 45, or at least about 50 weight percent, based on the combined weight of all resins in the layer. The at least one poly(vinyl acetal) resins can make up at least about 10, at least about 20, at least about 30, at least about 40, at least about 50, at least about 60, at least about 70, or at least about 80 weight percent of the layer, based on the combined weight of all resins. In some embodiments, the amount of resins other than the at least one poly(vinyl acetal) resin can be not more than about 20, not more than about 15, not more than about 10, not more than about 5, not more than about 2, or not more than about 1 weight percent, based on the combined weight of all resins. In some cases, the layer may include only a single poly(vinyl acetal) resin, while, in other cases, it may include a blend of two or more. The composition of each of the layers of the multi-layer interlayer may be the same, or one or more can be different than at least one other layer within the interlayer.

The poly(vinyl acetal) resin or resins used in the layers of the multi-layer interlayer can include residues of any suitable aldehyde and, in some embodiments, can include residues of at least one $C_1$ to $C_{10}$ aldehyde, at least one $C_4$ to $C_8$ aldehyde. Examples of suitable $C_4$ to $C_8$ aldehydes can include, but are not limited to, n-butyraldehyde, iso-butyraldehyde, 2-methylvaleraldehyde, n-hexyl aldehyde, 2-ethylhexyl aldehyde, n-octyl aldehyde, and combinations thereof. In some embodiments, the poly(vinyl acetal) resin or resins used in the layer or layers can include at least about 20, at least about 30, at least about 40, at least about 50, at least about 60, or at least about 70 weight percent of residues of at least one $C_4$ to $C_8$ aldehyde, based on the total weight of aldehyde residues of the resin, and/or can include not more than about 90, not more than about 85, not more than about 80, not more than about 75, not more than about 70, or not more than about 65 weight percent of at least one $C_4$ to $C_8$ aldehyde, or in the range of from about 20 to about 90, about 30 to about 80, or about 40 to about 70 weight percent of at least one $C_4$ to $C_8$ aldehyde. The $C_4$ to $C_8$ aldehyde may be selected from the group listed above, or it can be selected from the group consisting of n-butyraldehyde, iso-butyraldehyde, 2-ethylhexyl aldehyde, and combinations thereof.

In some embodiments, the poly(vinyl acetal) resin may be a polyvinyl butyral (PVB) resin. In other embodiments, the poly(vinyl acetal) resin can be a poly(vinyl n-butyral) resin that mainly comprises residues of n-butyraldehyde, and may, for example, include not more than about 50, not more than about 40, not more than about 30, not more than about 20, not more than about 10, not more than about 5, or not more than about 2 weight percent of residues of an aldehyde other than n-butyraldehyde, based on the total weight of all aldehyde residues of the resin.

When the poly(vinyl acetal) resin comprises a PVB resin, the molecular weight of the resins can be at least about 50,000, at least about 70,000, at least about 100,000 Daltons and/or not more than about 600,000, not more than about 550,000, not more than about 500,000, not more than about 450,000, or not more than 425,000 Daltons, measured by size exclusion chromatography using low angle laser light scattering (SEC/LALLS) method of Cutts and Ouano. As used herein, the term "molecular weight" refers to weight average molecular weight ($M_w$). The molecular weight of the poly(vinyl acetal) resin can be in the range of from about 50,000 to about 600,000, about 70,000 to about 450,000, or about 100,000 to about 425,000 Daltons.

According to some embodiments, two or more layers of the multi-layer interlayer can have different compositions. For example, in some embodiments, one or both of the outer skin layers may be formed form a first poly(vinyl acetal) resin, while the core or inner layer can be formed from a second poly(vinyl acetal) resin. In some embodiments, the poly(vinyl acetal) resin used to form the first layer can have a residual hydroxyl content and/or residual acetate content that is at least about 2, at least about 3, at least about 4, at least about 5, at least about 6, or at least about 8 weight percent higher or lower than the residual hydroxyl content and/or residual acetate content of the second poly(vinyl acetal) resin used to form the second layer.

As used herein, the terms "residual hydroxyl content" and "residual acetate content" refer to the amount of hydroxyl and acetate groups, respectively, that remain on a resin after processing is complete. For example, polyvinyl n-butyral can be produced by hydrolyzing polyvinyl acetate to polyvinyl alcohol, and then acetalizing the polyvinyl alcohol with n-butyraldehyde to form polyvinyl n-butyral. In the process of hydrolyzing the polyvinyl acetate, not all of the acetate groups are converted to hydroxyl groups, and residual acetate groups remain on the resin. Similarly, in the process of acetalizing the polyvinyl alcohol, not all of the hydroxyl groups are converted to acetal groups, which also leaves residual hydroxyl groups on the resin. As a result, most polyvinyl acetal) resins include both residual hydroxyl groups (as vinyl hydroxyl groups) and residual acetate groups (as vinyl acetate groups) as part of the polymer chain. The residual hydroxyl content and residual acetate content are expressed in weight percent, based on the weight of the polymer resin, and are measured according to ASTM D-1396, unless otherwise noted.

In some cases, the difference between the residual hydroxyl content of the polyvinyl acetal) resins in two or more of the layers (e.g., first and third and/or second and third) could also be at least about 2, at least about 5, at least about 10, at least about 12, at least about 15, at least about 20, or at least about 30 weight percent. As used herein, the term "weight percent different" or "the difference . . . is at least . . . weight percent" refers to a difference between two given weight percentages, calculated by subtracting the one number from the other. For example, a polyvinyl acetal) resin having a residual hydroxyl content of 12 weight percent has a residual hydroxyl content that is 2 weight percent lower than a polyvinyl acetal) resin having a residual hydroxyl content of 14 weight percent (14 weight percent-12 weight percent=2 weight percent). As used herein, the term "different" can refer to a value that is higher than or lower than another value.

At least one of the poly(vinyl acetal) resins used in one or more of the polymeric layers can have a residual hydroxyl content of at least about 14, at least about 14.5, at least about 15, at least about 15.5, at least about 16, at least about 16.5, at least about 17, at least about 17.5, at least about 18, at least about 18.5, at least about 19, at least about 19.5 and/or not more than about 45, not more than about 40, not more than about 35, not more than about 33, not more than about 30, not more than about 27, not more than about 25, not more than about 24, not more than about 23.5, not more than about 23, not more than about 22.5, not more than about 22, not more than about 21.5, not more than about 21, not more than about 20.5, or not more than about 20 weight percent, or in the range of from about 14 to about 45, about 16 to about 30, about 18 to about 25, about 18.5 to about 20, or about 19.5 to about 21 weight percent.

Another poly(vinyl acetal) resin used in one or more layers of the interlayer can have a residual hydroxyl content of at least about 8, at least about 9, at least about 10, at least about 11 weight percent and/or not more than about 30, not more than about 29, not more than about 28, not more than about 27, not more than about 26, not more than about 25, not more than about 24, not more than about 23, not more than about 22, not more than about 21, not more than about 20, not more than about 19, not more than about 19.5, not more than about 18, not more than about 17.5, not more than about 17, not more than about 16.5, not more than about 16, not more than about 15, not more than about 14.5, not more than about 13, not more than about 11.5, not more than about 11, not more than about 10.5, not more than about 10, not more than about 9.5, or not more than about 9 weight percent, or in the range of from about 8 to about 16, about 9 to about 15, or about 9.5 to about 14.5 weight percent, and can be selected such that the difference between the residual hydroxyl content of the poly(vinyl acetal) resins used to form two or more polymeric layers is at least about 2 weight percent, or within one or more of the ranges mentioned previously.

In some embodiments, at least one of the poly(vinyl acetal) resins used to, for example, form two different layers within the interlayer, can have a residual acetate content different than the other. For example, in some embodiments, the difference (or maximum difference) between the residual acetate content of two of the poly(vinyl acetal) resins (or any of the layers of the interlayer) can be at least about 2, at least about 3, at least about 4, at least about 5, at least about 8, at least about 10 weight percent and/or not more than about 15, not more than about 13, not more than about 10, not more than about 8, not more than about 6, not more than about 4, not more than about 2, not more than about 1, or not more than about 0.5 percent. One of the poly(vinyl acetal) resins may have a residual acetate content of less than 15, not more than about 13, not more than about 12, not more than about 10, not more than about 8, not more than about 6, not more than about 5, not more than about 4, not more than about 3, not more than about 2, not more than about 1, or not more than about 0.5 weight percent, measured as described above.

In some embodiments, at least one of the poly(vinyl acetal) resins used to form layers of the interlayer can have a residual acetate content of at least about 5, at least about 8, at least about 10, at least about 12, at least about 14, at least about 16, at least about 18, at least about 20, or at least about 30 weight percent. The difference in the residual acetate content between the poly(vinyl acetal) resins used in two or more polymeric layers can be within the ranges provided above, or the difference can be less than about 3, not more than about 2, not more than about 1, or not more than about 0.5 weight percent.

In some embodiments, the difference between the residual hydroxyl content of the poly(vinyl acetal) resins used in two or more layers can be less than about 2, not more than about 1, not more than about 0.5 weight percent and the difference in the residual acetate content between the poly(vinyl acetal) resins used in two or more layers can be at least about 3, at least about 5, at least about 8, at least about 15, at least about 20, or at least about 30 weight percent. In other embodiments, the difference in the residual acetate content of the poly(vinyl acetal) resins in two or more layers can be less than about 3, not more than about 2, not more than about 1, or not more than about 0.5 weight percent and the difference in the residual hydroxyl content of the same poly(vinyl acetal) resins can be at least about 2, at least about 5, at least about 10, at least about 12, at least about 15, at least about 20, or at least about 30 weight percent.

In various embodiments, the differences in residual hydroxyl and/or residual acetate content of the poly(vinyl acetal) resins in two or more of the polymeric layers including, for example, the skin and core layers, can be selected to control or provide certain performance properties, such as strength, impact resistance, penetration resistance, processability, or acoustic performance to the final composition, layer, or interlayer. For example, poly(vinyl acetal) resins having a higher residual hydroxyl content, usually greater than about 16 weight percent, can facilitate high impact resistance, penetration resistance, and strength to a resin composition or layer, while lower hydroxyl content resins, usually having a residual hydroxyl content of less than 16 weight percent, can improve the acoustic performance of the composition or layer.

One or more layers of the multi-layer interlayer may also include at least one plasticizer. Depending on the specific composition of layer, the plasticizer may be present in an amount of at least about 5, at least about 10, at least about 15, at least about 20, at least about 25, at least about 30, at least about 35, at least about 40, at least about 45, at least about 50, at least about 55, at least about 60 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the layer includes two or more resins, the weight of plasticizer is compared to the combined amount of all resins present to determine the parts per hundred resin. Further, when the plasticizer content of a layer is provided herein, it is provided with reference to the amount of plasticizer in the mix or melt that was used to produce the layer.

Examples of suitable plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate) and tetraethylene glycol di-(2-ethylhexanoate), or the plasticizer can comprise triethylene glycol di-(2-ethylhexanoate).

In some embodiments, the plasticizer included in one or more layers may be a high RI plasticizer. As used herein, the term "high RI plasticizer" means a plasticizer having a refractive index of at least 1.460, measured by ASTM D542 at a wavelength of 589 nm and a temperature of 25° C. When used, the high RI plasticizer can have a refractive index of at least about 1.470, at least about 1.480, at least about 1.490, at least about 1.500, at least about 1.510, at least about 1.520 and/or not more than about 1.600, not more than about 1.575, or not more than about 1.550, measured as discussed above.

Examples of types or classes of high RI plasticizers can include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. The high RI plasticizer may be selected from dipropylene glycol dibenzoate and tripropylene glycol dibenzoate, and/or 2,2,4-trimethyl-1,3-pentanediol dibenzoate.

When the polymeric layer or interlayer includes a high RI plasticizer, the plasticizer can be present in the layer alone or it can be blended with one or more additional plasticizers. The other plasticizer or plasticizers may also comprise high RI plasticizers, or one or more may be a lower RI plasticizer having a refractive index of less than 1.460. In some embodiments, the lower RI plasticizer may have a refractive index of less than about 1.450, less than about 1.445, or less than about 1.442 and can be selected from the group listed previously. When a mixture of two or more plasticizers are employed, the mixture can have a refractive index within one or more of the above ranges.

Poly(vinyl acetal) resins having higher or lower residual hydroxyl contents and/or residual acetate contents may also, when combined with at least one plasticizer, ultimately include different amounts of plasticizer. As a result, layers formed of poly(vinyl acetal) resins having different compositions may also have different properties within a single interlayer. Although not wishing to be bound by theory, it is assumed that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer polymeric layer that exhibits a lower glass transition temperature than a similar resin having a higher residual hydroxyl content. Depending on the specific resin and plasticizer, these trends could be reversed.

In some embodiments, the interlayer may include a skin layer(s) comprising a poly(vinyl acetal) resin and a plasticizer, and a core or inner polymeric layer comprising a poly(vinyl acetal) resin and a plasticizer. The plasticizer in the skin and core layers can be the same type of plasticizer, or the plasticizers may be different. In some embodiments, at least one of the plasticizers may also be a blend of two or more plasticizers. In some embodiments, the core layer can also include a plasticizer, which can be the same as or different than the plasticizer in the skin layers. Additionally, in some embodiments, the two outer skin layers can have compositions (including type and amount of plasticizer) which are nearly the same as, or identical to, each other.

When one of the skin and core layers includes a poly(vinyl acetal) resin having a residual hydroxyl content that is at least 2 weight percent higher or lower than the residual hydroxyl content of the poly(vinyl acetal) resin in another layer, the difference in plasticizer content between the two or more of the polymeric layers can be at least about 2, at least about 5, at least about 8, at least about 10, at least about 12, or at least about 15, at least about 20, at least about 25, at least about 30, or at least about 35 phr. In most embodiments, the polymeric layer that includes the resin having a lower hydroxyl content can have the higher plasticizer content. In order to control or retain other properties of the polymeric layer or interlayer, the difference in plasticizer content between two of the layers may be not more than about 75, not more than about 70, not more than about 65, not more than about 60, not more than about 55, not more than about 50, not more than about 45, not more than about 40, not more than about 30, not more than about 25, not more than about 20, or not more than about 17 phr. In other embodiments, the difference in plasticizer content between two of the polymeric layers can be at least about 40, at least about 50, at least about 60, or at least about 70 phr. In some embodiments, the outer skin layers (e.g., first and second layers) may have a plasticizer content that is lower than the plasticizer content of the inner core layer (e.g., third layer).

As a result, in some embodiments, at least two of the polymeric layers can exhibit different glass transition temperatures. Glass transition temperature, or $T_g$, is the temperature that marks the transition from the glass state of the polymer to the rubbery state. The glass transition temperatures of the layers described herein were determined by dynamic mechanical thermal analysis (DMTA). The DMTA measures the storage (elastic) modulus (G') in Pascals, loss (viscous) modulus (G") in Pascals, and the tan delta (G"/G') of the specimen as a function of temperature at a given oscillation frequency and temperature sweep rate. The glass transition temperature is then determined by the position of the tan delta peak on the temperature scale. Glass transition temperatures provided herein were determined at an oscillation frequency of 1 Hz under shear mode and a temperature sweep rate of 3° C./min.

The difference in the glass transition temperature of two of the layers (such as, for example, one of the outer layers and the core layer) can be at least about 2, at least about 3, at least about 5, at least about 8, at least about 10, at least about 12, at least about 15, at least about 18, at least about 20, at least about 22, at least about 25, at least about 30, or at least about 35° C. and/or not more than about 50, not more than about 45, not more than about 40, not more than about 35, not more than about 30, or not more than about 25° C. One of the layers (such as, for example, the skin layers) can have a glass transition temperature of at least about 26, at least about 28, at least about 30, at least about 33, at least about 35° C. and/or not more than about 70, not more than about 65, not more than about 60, not more than about 55, not more than about 50° C., not more than about 45° C., not more than about 40° C., not more than about 35° C., not more than about 30° C., or not more than about 25° C., or in the range of from about 26 to about 70, about 30 to about 60, about 35 to about 50° C. The other of the layers (such as, for example, the core layer) can have a glass transition temperature of not more than 25, not more than about 20, not more than about 15, not more than about 10, not more than about 5, not more than about 0, not more than about −5, or not more than about −10° C.

In some cases, the outer layer or layers of the multi-layer interlayer may have a higher Tg and therefore, may be considered a "stiff" outer layer, while the inner layer of the multi-layer interlayer may have a lower Tg and be considered a "soft" interlayer. In some embodiments, the outer skin layers may have a Tg that is at least about 2, at least about 5, at least about 10, at least about 15, at least about 20, at least about 25, at least about 30, or at least about 35° C. and/or not more than about 100, not more than about 90, not more than about 75, not more than about 70, not more than about 65, not more than about 60, not more than about 55, not more than about 50, not more than about 45, or not more than about 40, not more than about 35, not more than about 30, not more than about 25° C. higher than the Tg of the inner core layer.

In some embodiments, the interlayer may include one or more polymer films in addition to one or more polymer layers present in the interlayer. As used herein, the term "polymer film" refers to a relatively thin and often rigid polymer that imparts some sort of functionality or performance enhancement to the interlayer. The term "polymer film" is different than a "polymer layer" or "polymer sheet" as described herein, in that polymer films do not themselves provide the necessary penetration resistance and glass retention properties to the multiple layer panel, but, rather, provide performance improvements, such as infrared absorption or reflection character.

Poly(ethylene terephthalate), or "PET," may be used to form a polymer film and, ideally, the polymer films used in various embodiments are optically transparent. The polymer films suitable for use in certain embodiments may also be formed of other materials, including various metallic, metal oxide, or other non-metallic materials and may be coated or otherwise surface-treated. The polymer film may have a thickness of at least about 0.013, at least about 0.015, at least about 0.020, at least about 0.025, at least about 0.030, or at least about 0.040 mm and/or not more than about 0.060, not more than about 0.050, not more than about 0.045, or not more than about 0.035 mm. Other types of functional polymer films can include, but are not limited to, IR reducing layers, holographic layers, photochromic layers, electrochromic layers, antilacerative layers, heat strips, antennas, solar radiation blocking layers, decorative layers, and combinations thereof.

Additionally, one or more of the layers of the multi-layer interlayer may include at least one type of additive that can impart particular properties or features to the polymer layer or interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers. Additionally, various adhesion control agents ("ACAs") can also be used in one or more polymer layers in order to control the adhesion of the layer or interlayer to a sheet of glass. Specific types and amounts of such additives may be selected based on the final properties or end use of a particular interlayer and may be employed to the extent that the additive or additives do not adversely affect the final properties of the interlayer or windshield utilizing the interlayer as configured for a particular application.

In some embodiments, one or more layers in the interlayer can include an infrared (IR) absorber (or IR absorbing particles). In some cases, only one of the layers (first, second, or third) may include an IR absorber, while, in other embodiments, two or more of the layers can include an IR absorber. When present in two or more layers, the IR absorber can be the same or different in each layer, and the amounts of IR absorber in each layer can be the same (i.e., within not more than about 0.0050 wt %) of one another, or can be different (e.g., within more than 0.0050 wt % of one another). In some embodiments, the IR absorber can be present in the core layer. In some embodiments, the IR absorber may be present in one or both outer skin layers.

Overall, the IR absorber may be present in the interlayer in an amount of at least about 0.01, at least about 0.05, at least about 0.10, at least about 0.20, at least about 0.25, at least about 0.30, at least about 0.35, at least about 0.40, at least about 0.45, at least about 0.50 weight percent and/or not more than about 0.75, not more than about 0.70, not more than about 0.65, not more than about 0.60, not more than about 0.55, not more than about 0.50, not more than about 0.45, not more than about 0.40, not more than about 0.35, not more than about 0.30, not more than about 0.25, not more than about 0.20, not more than about 0.15, or not more than about 0.10 weight percent, based on the total weight of the interlayer. As used herein, the amount is calculated as an average amount, based on the total weight of the sample, layer, or interlayer.

In some embodiments, the amount of IR absorber in one or more layers can be at least about 0.005, at least about 0.0075, at least about 0.01, at least about 0.0125, at least about 0.015, at least about 0.0175, at least about 0.020, at least about 0.025, at least about 0.030, at least about 0.035, at least about 0.040, at least about 0.045, at least about 0.050, at least about 0.055 and/or not more than about 0.090, not more than about 0.080, not more than about 0.075, not more than about 0.070, not more than about 0.065, not more than about 0.060, not more than about 0.055, not more than about 0.050, not more than about 0.045, not more than about 0.040, not more than about 0.035, not more than about 0.030, not more than about 0.025, not more than about 0.020, not more than about 0.015, not more than about 0.010 weight percent, based on the total weight of the layer.

In some embodiments, the IR absorber may be substantially absent from one or more layers such that, for example, the amount of IR absorber in the layer is less than about 0.010, less than about 0.005, less than about 0.001, less than about 0.0005 weight percent, based on the total weight of the interlayer. In some embodiments, the IR absorber can be present in an amount in the ranges above in one or both outer skin layers and may be substantially absent from the inner core layer. In some embodiments, the IR absorber may be substantially absent from one or both outer skin layers and may be present in the inner core layer. In some embodiments, the IR absorber may be present in all layers of the interlayer.

When present in two or more layers in the interlayer, the amount of IR absorbing agent can be substantially the same in each layer, or it may be different amongst layers. For example, in some embodiments, the absolute value of the difference between amount of IR absorber in the two of the polymeric layers can be at least about 0.005, at least about 0.010, at least about 0.015, at least about 0.020 percent and/or not more than about 0.035, not more than about 0.030, not more than about 0.025, not more than about 0.020, not more than about 0.015, not more than about 0.010, not more than about 0.005 percent. In some embodiments, the amount of IR absorber can be substantially the same, such that the absolute value of the difference in the amount of IR absorber between two or more of the layers in which it is present can be within not more than about 0.0010, within not more than about 0.005, within not more than about 0.003, within not more than about 0.002, or within not more than about 0.001.

In some embodiments, the IR absorber may be present in a generally constant amount or concentration from the top to the bottom of the interlayer (or from the thinnest edge to the thickest edge of the tapered zone). That is, the absolute value of the difference between the concentration of IR absorber at one end (or the thinnest edge of the tapered zone) and the other end (or thickest edge of the tapered zone) of the interlayer may be less than about 0.0001, less than about 0.00005, or less than about 0.00001 weight percent. In other embodiments, the absolute value of the difference between the concentration of IR absorber at one end (or the thinnest edge of the tapered zone) and the other end (or thickest edge of the tapered zone) of the interlayer may be at least about 0.001, at least about 0.005, at least about 0.010, or at least about 0.025 weight percent and/or not more than about 0.5, not more than about 0.4, not more than about 0.3, not more than about 0.25 or not more than about 0.10 weight percent. This can result from each layer being formed from the same resin (including IR absorber concentration) at the thinnest and thickest portions of the tapered zone (or layer or interlayer).

Any suitable type of IR absorber (or IR absorbing agent) can be used. In some embodiments, the IR absorber can comprise an organic compound selected from the group consisting of phthalocyanine, naphthalocyanine, anthracyanine, derivatives thereof, and combinations thereof. In some embodiments, the IR absorber can comprise a metal such as copper, zinc, vanadium, or combinations thereof. In some embodiments, the IR absorber can comprise a quaterrylene imide. Alternatively, one or more IR absorbers as described in U.S. Pat. No. 6,737,159 (incorporated herein by reference to the extent not inconsistent with the present disclosure) can also be included alone or in addition to any of the IR absorbers described herein.

The IR absorber can be in any suitable form such as, for example, in the form of particles. When present in the form of particles, the IR absorber can have a particle size of at least about 5, at least about 10, at least about 15, at least about 20, at least about 25, at least about 30 nanometers (nm) and/or not more than about 100, not more than about 90, not more than about 80, not more than about 70, not more than about 60, not more than about 50, not more than about 40, or not more than about 35 nm. In some embodiments, the IR absorber can include metal oxide particles. Examples of suitable metal oxide particles can include, but are not limited to, metal oxide particles selected from the group consisting of aluminum-doped tin oxide, indium-doped tin oxide, antimony-doped tin oxide (ATO), gallium-doped zinc oxide (GZO), indium-doped zinc oxide (IZO), aluminum-doped zinc oxide (AZO), niobium-doped titanium oxide, sodium-doped tungsten oxide, cesium-doped tungsten oxide, thallium-doped tungsten oxide, rubidium-doped tungsten oxide, tin-doped indium oxide (ITO), tin-doped zinc oxide particles and silicon-doped zinc oxide, lanthanum hexaboride (LaB6), and combinations thereof.

In some embodiments, the IR absorber particles can comprise tungsten oxide particles represented by one of the following formulas:

$$W_yO_z,$$

where W is tungsten, O is oxygen, satisfying $2.0 < z/y < 3.0$, $2.2 \leq z/y \leq 2.99$, or $2.45 \leq z/y \leq 2.99$, and/or $$M_xW_yO_z$$

where M is an element selected from H, He, alkali metals, alkaline-earth metals, rare-earth metals, Mg, Zr, Cr, Mn, Fe, Rh, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, and combinations of two or more thereof, W is tungsten, O is oxygen, satisfying $0.001 \leq x/y \leq 1.0$ or $0.01 \leq x/y \leq 0.5$, and $2.0 \leq z/y \leq 3.0$, $2.2 \leq z/y \leq 2.99$, or $2.45 \leq z/y \leq 2.99$. Examples of tungsten/oxygen ratios include, without limitation, $WO_{2.92}$, $WO_{2.90}$, $W_{20}O_{58}$, $W_{24}O_{63}$, $W_{17}O_{47}$, $W_{18}O_{49}$, and the like. In preferred embodiments, the tungsten oxide agent is cesium tungsten oxide ($Cs_{0.33}WO_3$) having any of the above-described characteristics, and, in various embodiments, a cesium tungsten oxide agent having the mole ratio $Cs_{0.33}WO_3$ is used. In some embodiments, the IR absorbing particles can comprise cesium-doped tungsten oxide, cesium and tin-doped tungsten oxide, and combinations thereof.

In some embodiments, one or both of the outer skin layers may include a gradient color band near one or both of the edges of the interlayer. Such gradient color bands may be imbedded in all or a portion of the outer skin layer or layers of the interlayer and can have a thickness of at least about 0.025, at least about 0.05, at least about 0.075, at least about 0.10, at least about 0.125, at least about 0.15, at least about 0.175, at least about 0.20, or at least about 0.225 mm and/or not more than about 0.375, not more than about 0.35, not more than about 0.325, not more than about 0.30, not more than about 0.275, or not more than about 0.25 mm. The outer skin layer resin may be present on one or both sides of the interlayer at a thickness of at least about 0.0125, at least about 0.02, at least about 0.025, at least about 0.03, or at least about 0.04 mm and/or not more than about 0.075, not more than about 0.06, not more than about 0.05, not more than about 0.04, or not more than about 0.035 mm. As used herein, the term "outer skin layer" includes the gradient color band when present.

According to some embodiments, at least one of the surfaces of the layers or interlayer may be textured in order to facilitate formation of the interlayer or glazing. For example, at least a portion of at least one of the surfaces of one or more of the layers or interlayer may have a surface roughness (Rz) of at least about 20, at least about 25, at least about 30, at least about 35, at least about 40, at least about 45, or at least about 50 microns and/or not more than about 150, not more than about 140, not more than about 130, not more than about 120, not more than about 110, not more than about 100, not more than about 90, not more than about 80, not more than about 70, not more than about 60 microns, or not more than about 40 microns.

As used herein, Rz is a measure of the surface topography of the polymer layer and is an indication of the divergence of the surface from a plane. Additionally, the surface roughness of a layer may also be described by its Rsm, which is a measure of the distance between peaks in the topography of the surface of a polymer layer. Further description on how to determine Rz and Rsm are provided in U.S. Pat. No. 7,883,761, the entirety of which is incorporated herein by reference to the extent not inconsistent with the present disclosure.

The Rsm of at least a portion of the surface of one or more layers of the interlayer can be at least about 300, at least about 325, at least about 350, at least about 375, at least about 400, at least about 425, at least about 450, at least about 475, at least about 500, at least about 525, at least about 550, at least about 575, at least about 600, at least about 625, at least about 650, at least about 675, at least about 700, at least about 725, at least about 750, at least about 775, at least about 800, at least about 825, at least about 850, at least about 875, at least about 900, or at least about 925 microns. Alternatively, or in addition, the Rsm of at least a portion of a surface of one or more layers of the interlayer can be not more than about 1000, not more than about 950, not more than about 900, not more than about 850, not more than about 800, not more than about 750, not more than about 700, not more than about 650, not more than about 600, not more than about 550, or not more than about 500 microns.

In some embodiments, when two or more surfaces of a single layer or two or more surfaces of different layers are both textured, the surfaces may have different roughness numbers. For example, in some cases, one of the surfaces can have an Rz that is at least about 5, at least about 10, at least about 15, at least about 20, at least about 25, at least about 30, at least about 35, at least about 40, at least about 45, or at least about 50 percent different (i.e., higher or lower) than the Rz of the other surface. In some cases, this can be a difference of at least about 5, at least about 10, at least about 15, at least about 20, at least about 25, at least about 30, or at least about 35 microns and/or not more than about 100, not more than about 75, not more than about 60, not more than about 50, not more than about 40, not more than about 35, not more than about 30, not more than about 25, or not more than about 20 microns.

Such roughness can be achieved by any suitable method including, but not limited to, embossing, melt fracturing, and combinations thereof. Methods of determining surface roughness are described in U.S. Pat. No. 7,883,761, incorporated herein by reference to the extent not inconsistent with the present disclosure.

Interlayers as described herein may be formed by any suitable method. In some embodiments, the method for producing the multi-layer interlayer may include the step of providing a first type of resin and a second type of resin. The first type of resin may be used to form the skin layers, for example, and may be considered a "skin" resin, while the second type of resin may be used to form the core layer and can be considered a "core" resin. As discussed previously, the skin and core resins may include, for example, a poly (vinyl butyral) resin and a plasticizer and can have different compositions from one another.

In order to form an interlayer as described herein, the skin resin may be split into two or more portions, one portion being used to form one of the outer skin layers and the other portion being used to form the other outer skin layer. In some cases, the first and second portions of the skin resin may be supplied to the die at different mass flow rates in order to form outer skin layers having different thicknesses. In some embodiments, the mass flow rate of the resin used to form one of the (thinner) skin layers may be at least about 10, at least about 15, at least about 20, at least about 25, at least about 30, at least about 35, at least about 40, at least about 45, at least about 50, at least about 55, at least about 60, at least about 65, at least about 70, at least about 75, or at least about 80 percent lower than the mass flow rate of the resin used to form the other (thicker) skin layer.

In some embodiments, the mass flow rate of the resin used to form one of the skin layers can be not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, or not more than about 25 percent of the mass flow rate of the resin used to form the other skin layer.

In some cases, the different mass flow rates used to form the outer skin layers can be provided by one or more of several techniques. For example, in some embodiments, the skin resin may be split into two streams and each stream may be controlled to have a different mass flow rate. As a result, the thickness of each layer may be different, thereby providing an interlayer having skin layers as described herein.

Several methods of controlling the mass flow rates of the portions of skin resin exits. In some cases, the mass flow rate of the streams of skin resin can be controlled by using separate pumps for individually controlling the mass flow rates of the resins used to form each of the outer layers. In some embodiments, the different mass flow rates of the resins can be achieved by using separate extruders to individually form the outer skin layers, which can thereafter be laminated (along with a core layer) to form a multi-layer interlayer.

When forming the interlayer, the skin layer resin may be split into two or more portions used to form at least the outer skin layers. Prior to forming the layers, the skin resin stream may be split into two portions using a splitter, and the separate streams may be formed into sheets or layers using a die. A first flow path for the first portion of the resin melt or stream may be defined between the splitter and the die and a second flow path can be defined between the splitter and the die and, in some cases, a flow restrictor may be present along the second flow path so that the mass flow rate of one of the streams (passing over or through the flow restrictor) is less than the mass flow rate of the stream in the first flow path. In some embodiments, the flow restrictor can have a minimum open area that is not more than about 95, not more than about 90, not more than about 85, not more than about 80, not more than about 75, not more than about 70, not more than about 65, not more than about 60, not more than about 55, or not more than about 50 percent of the minimum open area along the first flow path.

In some embodiments, different mass flow rates of resin can be achieved by using melt pipes having different average cross-sectional areas to transport the resin to the die to form each of the outer skin layers. That is, the diameter of at least a portion of the pipe used to form all or a portion of the first flow path can be smaller than the diameter of at least a portion of the pipe used to form all or a portion of the second flow path. In some cases, the minimum diameter of the pipe in the second flow path can be at least about 5, at least about 10, at least about 15, at least about 20, at least about 25, at least about 30, or at least about 35 percent smaller than the minimum diameter of the pipe in the first flow path.

In some cases, each of the above may be used, while, in others, only one or some combination of two or more of the above methods may be used when forming an interlayer as described herein.

In some embodiments, the forming of the outer skin layers may be performed using a die having a first skin outlet for forming the first outer skin layer and a second skin outlet for forming a second skin layer. The first and second skin outlets may have substantially corresponding thicknesses along the widths of the first and second skin outlets. In some cases, such outlets may be geometrically identical and/or one or both of the first and second skin outlets may be wedge shaped.

In some embodiments, the multilayer interlayer may be formed by co-extrusion. In such a process, at least three streams of resin, including a first outer skin resin stream, a second outer skin resin stream, and an inner core resin stream located between the first and second outer skin resin streams may be extruded out of a die simultaneously to form the co-extruded resin sheet.

When at least a portion of the interlayer is formed by co-extrusion, the co-extruded layers may be formed using a multi-manifold die having at least two outlets configured to form layers of different thicknesses and/or shapes. The flow of resin, including skin resin, to the different outlets may be different, in order to form skin layers in the final interlayer as described herein.

In other cases, at least a portion of the coextrusion could be formed using a single manifold die, with the flow of the skin resin being divided by a die feedblock with one or more dividing elements. The resulting flows of skin resin could then be regulated as described above in order to provide an interlayer having skin layers as mentioned herein.

In some embodiments, the multi-layer interlayer may be formed by separately extruding each of the first outer skin, second outer skin, and core layer resin streams to form three separate layers, then laminating the layers to one another to form the multi-layer interlayer.

In some embodiments, both co-extrusion and lamination may be used to form the multiple layer interlayer. In some cases, co-extrusion may be used to form a multiple layer sheet having, for example, at least 2, at least 3, or 4 or more layers. Then, the sheet may be laminated to another sheet including 1 or more other layers to form the multiple layer interlayer. In some cases, one or more layers of the sheets may be flat, while one or more layers of the sheets may be wedge shaped. In some embodiments, the multi-layer sheet may have a flat profile and may be laminated to a single layer sheet having a wedged profile to provide a wedge-shaped multi-layer interlayer.

Interlayers configured and formed according to embodiments of the present invention may exhibit enhanced optical and/or acoustic properties as compared to interlayers formed from conventional polymeric layers. For example, in some embodiments, the interlayer may have a mottle value of not more than about 3.5, not more than about 3.25, not more than about 3, not more than about 2.75, not more than about 2.5, not more than about 2.25, not more than about 2, not more than about 1.75, not more than about 1.5, or not more than about 1. Mottle is measure of optical quality, which is detected as a texture or graininess. When mottle is too high or too severe, it results in an objectionable visual appearance in the interlayer or glazing.

Mottle is assessed and categorized by a side-by-side qualitative comparison of shadowgraph projections for a test laminate with a set of standard laminate shadowgraphs that represent a series, or scale, of mottle values ranging from 1 to 4, with 1 representing a standard of low mottle (i.e., a low number of disruptions) and 4 representing a standard of high mottle (i.e., a high number of disruptions). High mottle is generally considered objectionable, particularly in automotive and architectural applications. Optionally, a model laminate having a single layer interlayer with zero mottle (no mottle) is used to facilitate the evaluation in a test laminate that has a mottle rating lower than the scale of the standard set, such as lower than a rating of 1. A test laminate that shows a shadowgraph projection similar to that of a zero-mottle laminate is assessed to have a mottle rating of zero. The test laminate is prepared with two sheets of clear glass each having a thickness of 2.3 mm (commercially available from Pittsburgh Glass Works of Pennsylvania) and an interlayer. The interlayer typically has a random rough surface $R_z$ of about 35 to 40 microns and thickness of 0.76 to 0.86 mm.

The mottle values provided herein were determined using a Clear Mottle Analyzer (CMA) that includes a xenon arc lamp, a sample holder, a projection screen, and a digital camera. The xenon arc lamp is used to project a shadowgraph of a laminated sample onto the screen and the camera is configured to capture an image of the resulting shadowgraph. The image is then digitally analyzed using computer imaging software and compared to images of previously-captured standard samples to determine the mottle of the sample. A method of measuring mottle using a CMA is described in detail in U.S. Pat. No. 9,311,699.

In some cases, the mottle of interlayers having outer skin layers of different thicknesses as described herein may be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, or at least about 95 percent lower than the mottle value of an identical interlayer of the same configuration and composition, but including two outer skin layers having the same thickness.

Clarity is another optical parameter used to describe the performance of the interlayers described herein and may be determined by measuring haze value or percent. Haze value represents the quantification of light scattered by a sample in contrast to the incident light. In some embodiments, the resin blends, layers, and interlayers described herein may have a haze value of less than 5 percent, less than about 4 percent, less than about 3 percent, less than about 2 percent, less than about 1, or less than about 0.5 percent, as measured in accordance with ASTM D1003-13—Procedure B using Illuminant C, at an observer angle of 2 degrees. The test is performed with a spectrophotometer, such as a Hunterlab UltraScan XE instrument (commercially available from Hunter Associates, Reston, Va.), on a polymer sample having a thickness of 0.76 mm, which has been laminated between two sheets of clear glass each having a thickness of 2.3 mm (commercially available from Pittsburgh Glass Works of Pennsylvania).

In some embodiments, interlayers as described herein may have a percent visual transmittance (% Tvis), which is measured using a spectrophotometer, such as a HunterLab UltraScan EX, in accordance with ASTM D1003, Procedure B using Illuminant C at an observer angle of 2°. The values provided herein were obtained by analyzing a glass laminate samples having an interlayer thickness of about 0.76 mm and a clear glass thickness of 2.3 mm (commercially available from Pittsburgh Glass Works of Pennsylvania). In some embodiments, the polymeric layers and interlayers of the present invention can have a percent visual transmittance of at least about 65, at least about 70, at least about 75, at least about 80, at least about 81, at least about 82, at least about 83, at least about 84, at least about 85, at least about 85.5, at least about 86, at least about 86.5, at least about 87, at least about 87.5, at least about 88, or at least about 88.5 percent. These values may refer to the overall or average transmittance of the entire interlayer.

In some embodiments, the interlayer may have visual properties that vary little between the thinnest and thickest edges of the tapered zone. For example, the interlayer may have a visual transmittance at the thickest edge (% Tvis) that is within about 30, within about 25, within about 20, within about 15, within about 10, within about 5, within about 4.5, within about 4, within about 3.5, within about 3, within about 2.5, within about 2, within about 1.5, within about 1, within about 0.75, within about 0.65, within about 0.60, within about 0.55, within about 0.50, within about 0.45, within about 0.40 percent of the visual transmittance at the thinnest edge (% Tvis) of the tapered zone. The visual transmittance at the thinnest edge of the tapered zone and/or at the thickest edge of the tapered zone can be at least about 65, at least about 70, at least about 75, at least about 80, at least about 81, at least about 82, at least about 83, at least about 84, at least about 85, at least about 85.5, at least about 86, at least about 86.5, at least about 87, at least about 87.5, at least about 88, or at least about 88.5 percent.

In some embodiments, the interlayer can have a total solar transmittance (% Tts) of not more than about 75, not more than about 70, not more than about 65, not more than about 60, not more than about 55, not more than about 50, or not more than about 45%, measured according ISO 13837. Additionally, the total solar transmittance may not vary substantially across the tapered zone, despite the change in thickness profile of one or more layers and the overall interlayer. In some embodiments, the interlayer can have a total solar transmittance (300 nm to 2500 nm) at the thickest edge of the tapered zone (% Tts) that is within about 30, within about 25, within about 20, within about 15, within about 10, within about 5, within about 4.5, within about 4, within about 3.5, within about 3, within about 2.5, within about 2, within about 1.5, within about 1, within about 0.75, within about 0.70, within about 0.65, within about 0.60, within about 0.55, within about 0.50, within about 0.45, within about 0.40, within about 0.35, within about 0.30, within about 0.25, within about 0.20, within about 0.15, within about 0.10, within about 0.05, within about 0.01, within about 0.005, within about 0.001, or within about 0% of the total solar transmittance at the thinnest edge of the tapered zone (% Tts). The overall solar transmittance at the thinnest and/or thickest edge of the tapered zone can be not more than about 75, not more than about 70, not more than about 65, not more than about 60, not more than about 55, not more than about 50, not more than about 55, or not more than about 45%, measured as described previously.

Interlayers as described herein may also exhibit desirable acoustic performance. For example, in some embodiments, the interlayer according to embodiments of the present invention may have a tan delta value of at least about 0.70. Tan delta is the ratio of the loss modulus (G") in Pascals to the storage modulus (G') in Pascals of a specimen measured by Dynamic Mechanical Thermal Analysis (DMTA). The DMTA is performed with an oscillation frequency of 1 Hz under shear mode and a temperature sweep rate of 3° C./min. The peak value of the G"/G' curve at the glass transition temperature is the tan delta value. The tan delta of the interlayers described herein may be at least about 1.0, at least about 1.05, at least about 1.10, at least about 1.25, at least about 1.50, at least about 1.75, at least about 2.0, or at least about 2.25 and/or not more than about 5, not more than about 4.75, not more than about 4.5, not more than about 4.25, not more than about 4, not more than about 3.75, not more than about 3.5, not more than about 3.25, not more than about 3, or not more than about 2.5.

Additionally, the interlayers can have a damping loss factor, or loss factor, of at least about 0.10, at least about 0.15, at least about 0.17, at least about 0.20, at least about 0.25, at least about 0.27, at least about 0.30, at least about 0.33, or at least about 0.35. Loss factor is measured by Mechanical Impedance Measurement as described in ISO Standard 16940. A polymer sample is laminated between two sheets of clear glass, each having a thickness of 2.3 mm, and is prepared to have a width of 25 mm and a length of 300 mm. The laminated sample is then excited at the center point using a vibration shaker, commercially available from Brüel and Kjær (Nærum, Netherlands) and an impedance head (Brüel and Kjær) is used to measure the force required to excite the bar to vibrate and the velocity of the vibration. The resultant transfer function is recorded on a National Instrument data acquisition and analysis system and the loss factor at the first vibration mode is calculated using the half power method.

Interlayers as described herein may be used to form a glazing. Glazings (or laminates or panels) may be formed by sandwiching an interlayer according to embodiments of the present invention between a first and second rigid substrate and laminating the construct to form a multi-layer glazing. In some embodiments, a glazing can refer to an interlayer sandwiched between a rigid substrate and a polymer film, such as, for example, a bilayer.

Multiple layer glazings or panels as described herein generally comprise a first rigid substrate sheet having a first substrate thickness and a second rigid substrate sheet having a second substrate thickness. Each of the first and second substrates can be formed of a rigid material, such as glass, and may be formed from the same, or from different, materials. In some embodiments, at least one of the first and second substrates can be a glass substrate, while, in other embodiments, at least one of the first and second can be formed of another material including, for example, a rigid polymer such as polycarbonate, copolyesters, acrylic, polyethylene terephthalate, and combinations thereof. In embodiments, both rigid substrates are glass. Any suitable type of non-glass material may be used to form such a substrate, depending on the required performance and properties. Typically, none of the rigid substrates are formed from softer polymeric materials, including thermoplastic polymer materials as described in detail below.

Any suitable type of glass may be used to form the rigid glass substrate, and, in some embodiments, the glass may be selected from the group consisting of alumina-silicate glass, borosilicate glass, quartz or fused silica glass, and soda lime glass. The glass substrate, when used, may be annealed, thermally-strengthened or tempered, chemically-tempered, etched, coated, or strengthened by ion exchange, or it may have been subjected to one or more of these treatments. The glass itself may be rolled glass, float glass, or plate glass. In some embodiments, the glass may not be chemically-treated or strengthened by ion exchange, while, in other embodiments, the glass may not be an alumina-silicate glass. When the first and second substrates are glass substrates, the type of glass used to form each substrate may be the same or different.

The rigid substrates can have any suitable thickness. In some embodiments, when the rigid substrates are all glass substrates, the nominal thickness of at least one of the glass sheets (first or second glass) ranges from 0.1 mm to 12.7 mm and the multiple layer glass panels include the configurations of any combinations of the first and second glass sheets (and any other glass or rigid sheets, if desired). In some embodiments, the nominal thickness of the first and/or second substrates can be at least about 0.4, at least about 0.5, at least about 0.7, at least about 0.75, at least about 1.0, at least about 1.25, at least about 1.3, at least about 1.6, at least about 1.9, at least about 2.2, at least about 2.5, or at least about 2.8 and/or less than about 3.2, less than about 2.9, less than about 2.6, less than about 2.5, less than about 2.3, less than about 2.0, less than about 1.75, less than about 1.7, less than about 1.5, less than about 1.4, or less than about 1.1 mm.

Additionally, or in the alternative, the first and/or second substrates can have a nominal thickness of at least about 2.3, at least about 2.6, at least about 2.9, at least about 3.2, at least about 3.5, at least about 3.8, or at least about 4.1 and/or less than about 12.7, less than about 12.0, less than about 11.5, less than about 10.5, less than about 10.0, less than about 9.5, less than about 9.0, less than about 8.5, less than about 8.0, less than about 7.5, less than about 7.0, less than about 6.5, less than about 6.0, less than about 5.5, less than about 5.0, or less than about 4.5 mm. Other thicknesses may be appropriate depending on the application and properties required.

When multiple layer panels include two substrates having the same nominal thickness such panels may be referred to as "symmetric configurations," because the ratio of the nominal thickness of one substrate to the nominal thickness of the other substrate equals 1 When multiple layer panels include two substrates having different nominal thicknesses such panels may be referred to as "asymmetric configurations," because the ratio of the nominal thickness of one substrate to the nominal thickness of the other substrate does not equal 1. As used herein, asymmetric configurations or asymmetric panels are characterized in that the ratio of the thicknesses of the substrates (thinner substrate to thicker substrate) is less than 1, and symmetric configurations or symmetric panels are characterized in that the ratio of the thicknesses of the substrates is equal to 1 (i.e., the substrates have the same thickness).

In some embodiments, the multiple layer panel may include two substrates having the same nominal thickness. In other embodiments, the multiple layer panel may include two substrates having different nominal thicknesses. As used herein, the terms "symmetry of substrate" and "symmetry of glass" refer to the ratio of the nominal thickness of the first or thinner substrate (or glass sheet) to the nominal thickness of the second or thicker substrate (or glass sheet), and the terms may be used interchangeably. The "symmetry of glass" is determined by equation (VI):

$$\text{Symmetry of Glass}(S_G) = H_3/H_1 \qquad (2),$$

wherein $H_3$ is the nominal thickness of the thinner (first) glass substrate, $H_1$ is the nominal thickness of the thicker (second) glass substrate, and $H_3/H_1$.

As used herein, when referring to a multiple layer glass panel the term "symmetrically configured" means having a symmetry of glass, $S_G$, equal to 1 and the term "asymmetrically configured" means having a symmetry of glass of less than 1. The terms "symmetry of glass", "symmetrically configured", "symmetrical configuration" and "symmetry of glass configuration" may be used interchangeably throughout. The terms "asymmetrically configured" and "asymmetrical configuration" may be used interchangeably throughout.

In some embodiments, multiple layer panels or glazings as described herein can have a symmetry of glass of at least about at least about 0.10, at least about 0.15, at least about 0.20, at least about 0.23, at least about 0.25, at least about 0.30, at least about 0.35, at least about 0.40, at least about 0.45, at least about 0.50, at least about 0.55, at least about 0.60, at least about 0.65, at least about 0.70, at least about 0.75 and/or about 1, not more than about 0.99, not more than about 0.97, not more than about 0.95, not more than about 0.90, not more than about 0.85, not more than about 0.80, not more than about 0.75, not more than about 0.70, not more than about 0.65, not more than about 0.60, not more than about 0.55, not more than about 0.50, not more than about 0.45, not more than about 0.40, not more than about 0.35, not more than about 0.30. In some embodiments, multiple layer panels as described herein may be symmetrical and have a symmetry of glass of 1.

When the multiple layer panel has an asymmetric configuration, the difference between the nominal thickness of the thicker substrate and the nominal thickness of the thinner substrate can be at least about 0.05 mm. In some embodiments, at least one glass sheet has a nominal thickness that can be at least about 0.1, at least about 0.2, at least about 0.3, at least about 0.4, at least about 0.5, at least about 0.6, at least about 0.7, at least about 0.8, at least about 0.9, at least about 1.0, at least about 1.2, at least about 1.6, at least about 2.0, at least about 3.0, or at least about 4.0 mm thicker than the nominal thickness of at least one of the other glass sheets, or each of the other glass sheets.

In some embodiments, the one layer of glass (or rigid substrate) may be at least about 1.05, at least about 1.1, at least about 1.2, at least about 1.3, at least about 1.4, at least about 1.5, at least about 1.6, at least about 1.7, at least about 1.8, at least about 1.9 or 2.0 times thicker than the other layer of glass and/or not more than about 10, not more than about 8, not more than about 6, not more than about 5, not more than about 4, not more than about 3.5, not more than about 3, not more than about 2.5, not more than about 2, not more than about 1.5 times thicker than the other layer of glass (or rigid substrate).

In some embodiments, one or both of the substrates may be wedged. When one or both of the rigid substrates are wedged substrates, the substrate may define a wedge angle of at least about 0.05, at least about 0.10, at least about 0.15, at least about 0.20, at least about 0.25, at least about 0.30, or at least about 0.35 milliradians and/or not more than about 1, not more than about 0.95, not more than about 0.90, not more than about 0.85, not more than about 0.80, not more than about 0.75, not more than about 0.70, not more than about 0.65, not more than about 0.60, not more than about 0.55 milliradians. When both of the substrates are wedge-shaped, the substrates can have substantially similar wedge angles within about 0.001, about 0.005, or within about 0.01 milliradians of one another.

Alternatively, one of the wedged substrates may have a different wedge angle than the other when both are wedged. For example, in some embodiments, one of the substrates may have a wedge angle that is less than the wedge angle of the other substrate. In some embodiments, the difference between wedge angles of two wedged substrates may be at least about 0.05, at least 0.075, at least about 0.10, or at least about 0.12 milliradians and/or not more than about 0.50, not more than about 0.45, not more than about 0.40, not more than about 0.35, not more than about 0.30, not more than about 0.25, not more than about 0.20, or not more than about 0.15 milliradians. In some embodiments, one or both of the rigid substrates may each have a uniform thickness (e.g., may not be wedged or may be substantially flat).

Examples of suitable types of multi-layer panels can include windows for automotive applications including, but not limited to, windshields, side windows, and sunroofs. Examples of suitable types of multi-layer panels for architectural applications include, but are not limited to, windows, laminated glass panels for doors, walls, ceilings, and walkways, and the like.

In some embodiments, as schematically depicted in FIG. 7, for example, a windshield 20 formed as described herein may have a lower thinner edge 14 and an upper thicker edge 12. In some cases, the lower edge 14 can have a total thickness of at least about 1.5, at least about 2, at least about 2.5, at least about 3, or at least about 3.25 mm and/or not more than about 10, not more than about 8, not more than about 6, not more than about 5, or not more than about 4 mm. The thickness of the thicker (upper) edge 12 may be at least about 1.1, at least about 1.25, at least about 1.5, at least about 1.75, at least about 2.0, at least about 2.25, or at least about 2.5 times thicker than the thickness of the thinner (lower edge). In some cases, the maximum thickness of the interlayer at or near the thinnest (lower) edge 14 of the windshield does not exceed 0.3 mm, 0.29 mm, 0.28 mm, 0.27 mm, 0.26 mm, 0.25 mm, or 0.24 mm within about 40, within about 50, within about 60, within about 70, within about 80, or within about 85 mm from the thinnest edge 14.

In some embodiments, the windshield (or other panel) may have a wedge angle of at least about 0.05, at least about 0.10, at least about 0.15, at least about 0.2, or at least about 0.3 milliradians and/or not more than about 1, not more than about 0.90, not more than about 0.80, not more than about 0.75, not more than about 0.70, or not more than about 0.60 milliradians.

The following examples further illustrate how the polyesters in the invention can be made and evaluated, and how the polyurethane adhesives can be made and evaluated and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLE

Figure 10:
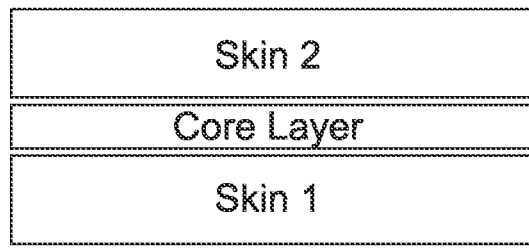
FIG. 10 is a cross-section of the thickness of a comparative interlayer tested as described in Example 1.

Two different multi-layer interlayers were formed from three layers of poly(vinyl butyral) plasticized with triethyleneglycol di-2-ethylhexanoate. The first interlayer, Comparative Interlayer 1 (CIL-1) included two outer skin layers, shown in FIG. 10 as Skin 1 and Skin 2, and an inner core layer, shown in FIG. 10 as Core Layer. As shown in FIG. 10, the nominal thicknesses of Skin 1 and Skin 2 of CIL-1 were approximately the same, and the nominal thickness of Core Layer of CIL-1 was less than either skin layer. A second similar comparative interlayer was also formed and is referred to herein as Comparative Interlayer 2 (CIL-2). Table 1 below summarizes the composition of the Skin and Core Layers of CIL-1 and CIL-2.

TABLE 1

| Layer | PVOH Content (wt %) | PVAc Content (wt %) | Plasticizer (phr) |
| --- | --- | --- | --- |
| Skin 1 & 2 | 17.5-19.5 | <3 | 36-41 |
| Core | 8-12 | <3 | 50-90 |

Figure 11:
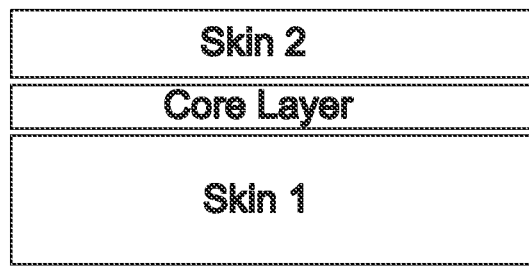
FIG. 11 is a cross-section of the thickness of an interlayer according to embodiments of the present technology, tested as described in Example 1.

Another interlayer, Disclosed Interlayer 1 (DIL-1) was also formed from three layers of poly(vinyl butyral) having the same composition as the corresponding layers of CIL-1, as summarized in Table 1, above. However, as shown in FIG. 11, one of the outer skin layers of DIL-1 (Skin 2) was thinner than the other outer skin layer (Skin 1) of DILA A second similar disclosed interlayer was also formed and is referred to herein as Disclosed Interlayer 2 (DIL-2).

The thicknesses of each of Skin Layers 1 and 2 and the Core Layer for CIL-1 and 2 and IFIL-1 and 2 are summarized in Table 2, below.

Additionally, the surface roughness (as Rz and Rsm) for each of skin layer of CIL-1 and 2, and DIL-1 and 2 were measured and are also provided in Table 2, below.

TABLE 2

| | Thickness (mil) | | | Skin 1 | | Skin 2 | | |
| --- | --- | --- | --- | --- | --- | --- | --- | --- |
| Interlayer | Skin 1 | Core | Skin 2 | Rz (μm) | Rsm (μm) | Rz (μm) | Rsm (μm) | Mottle |
| CIL-1 | 13.5 | 4.5 | 13.5 | 38.1 | 773.9 | 34.7 | 795.3 | 3.7 |
| CIL-2 | 13.6 | 4.2 | 13.7 | 42.3 | 940.9 | 23.4 | 513.7 | 3.9 |
| DIL-1 | 16.7 | 4.3 | 10.3 | 40.9 | 837.5 | 20.9 | 446.9 | 1.2 |
| DIL-2 | 16.9 | 4.3 | 10.6 | 41.1 | 851.5 | 19.9 | 464.8 | 2.0 |

As shown above, CIL-1 had similar surface topography on both skin layers, and exhibited relatively high mottle (3.7). Additionally, although CIL-2 had a lower Rz and Rsm than CIL-1, CIL-2 still exhibited very high mottle (3.9).

Disclosed Interlayers 1 and 2 (DIL-1 and DIL-2) both included outer skin layers with similar surface topography as CIL-2, but exhibited significantly reduced mottle (1.2 for DIL-1 and 2.0 for DIL-2).

What is claimed is:

1. A wedge-shaped multi-layer interlayer comprising:
a first polymeric layer having a wedge shape;

a second polymeric layer having a wedge shape; and
a third polymeric layer between said first and second layers,
wherein said first and second layers each have a glass transition temperature (Tg) that is at least 10° C. higher than the Tg of said third layer,
wherein, at one or more locations on said interlayer, said second layer is at least 10 percent thicker than said first layer, and wherein at least one of the first and second layers has a thickness of not more than 0.30 mm at one or more locations on the interlayer; wherein said interlayer is a tri-layer interlayer, wherein each of said first, second, and third layers are formed of a plasticized polyvinyl acetal resin, wherein the third polymeric layer has a plasticizer content that is at least 5 parts per hundred resin (phr) and/or not more than 75 phr different than the plasticizer content of the first and/or second polymeric layers, wherein the third polymeric layer has a glass transition temperature (Tg) that is at least 2° C. and/or not more than 50° C. different than the Tg of the first and/or second polymeric layers, wherein said polyvinyl acetal comprises polyvinyl butyral, wherein said polyvinyl butyral in said first and said second layers has a residual acetate content of less than 15 weight percent, wherein the maximum difference between the residual hydroxyl contents of the polyvinyl butyral in said first or said second and said third polymeric layers is at least 3 percent, wherein at least a portion of the surface of said interlayer has a surface roughness (Rz) of 5 to 75 microns, wherein said interlayer has an overall wedge angle of at least 0.05 milliradians and not more than 1 milliradian, wherein said interlayer has a mottle value of not more than 3.5.

2. The interlayer of claim 1, wherein said interlayer has a thinnest edge of the multi-layer interlayer and a thickest edge of the multi-layer interlayer, wherein a maximum thickness of the multi-layer interlayer of at least one of said first and second outer layers does not exceed 0.3 mm within 40 centimeters of said thinnest edge of the multi-layer interlayer.

3. The interlayer of claim 1, wherein, at one or more locations on said interlayer, said first layer has a thickness of less than 0.3 millimeters and said second layer has a thickness of greater than 0.3 millimeters.

4. The interlayer of claim 1, wherein, at one or more locations on said interlayer, said first layer is at least 0.01 millimeters thinner than said second layer.

5. The interlayer of claim 1, wherein across at least 25 percent of the total area of said interlayer said first layer is at least 10 percent thinner than said second layer.

6. The interlayer of claim 1, wherein said interlayer has a thinnest edge of the multi-layer interlayer and an opposite thickest edge of the multi-layer interlayer, wherein a maximum thickness of at least one of said first and second layers does not exceed 0.3 millimeters within 10 centimeters of said thinnest edge of the multi-layer interlayer.

7. The interlayer of claim 1, wherein said interlayer has a thinnest edge of the multi-layer interlayer and an opposite thickest edge of the multi-layer interlayer, wherein said thinnest edge of the multi-layer interlayer has a total thickness of at least 0.5 and/or not more than 1.1 mm, wherein said thickest edge of the multi-layer interlayer has a thickness of at least 0.6 mm and/or not more than 2.0 mm.

8. The interlayer of claim 1, wherein the ratio of the thickness of the multi-layer interlayer of said first polymeric layer to the thickness of said thinnest edge of the multi-layer interlayer of said tapered zone is at least 0.20:1 and/or not more than 0.85:1, and wherein the ratio of the thickness of said second polymeric layer to the thickness of the multi-layer interlayer of said thinnest edge of the multi-layer interlayer of said tapered zone is at least 0.1:1 and/or not more than 0.45:1.

* * * * *